United States Patent
Retterath

(10) Patent No.: US 11,001,979 B2
(45) Date of Patent: May 11, 2021

(54) METHODS AND APPARATUS FOR ULTRAWIDE ENTRANCE ANGLE REFLECTIVE ARTICLES FOR USE WITH AUTONOMOUS VEHICLE MACHINE VISION SYSTEMS

(71) Applicant: Vergence Automation, Inc., Excelsior, MN (US)

(72) Inventor: James E. Retterath, Excelsior, MN (US)

(73) Assignee: Vergence Automation, Inc., Excelsior, MN (US)

( * ) Notice: Subject to any disclaimer, the term of this patent is extended or adjusted under 35 U.S.C. 154(b) by 0 days.

(21) Appl. No.: 16/537,275

(22) Filed: Aug. 9, 2019

(65) Prior Publication Data
US 2020/0048847 A1 Feb. 13, 2020

Related U.S. Application Data

(60) Provisional application No. 62/718,183, filed on Aug. 13, 2018, provisional application No. 62/753,207, filed on Oct. 31, 2018.

(51) Int. Cl.
*G06K 9/00* (2006.01)
*G02B 27/00* (2006.01)
(Continued)

(52) U.S. Cl.
CPC .............. *E01F 9/512* (2016.02); *G02B 5/124* (2013.01); *G06K 9/00818* (2013.01);
(Continued)

(58) Field of Classification Search
CPC ...... G02B 2027/0141; G02B 2027/014; G02B 2027/0138; G02B 27/0101; G02B 5/124; E01F 9/512; G06K 9/00818
See application file for complete search history.

(56) References Cited

U.S. PATENT DOCUMENTS

| 1,743,835 A | 1/1930 | Stimson |
| 3,541,606 A | 11/1970 | Heenan et al. |

(Continued)

FOREIGN PATENT DOCUMENTS

| CA | 1291465 C | 10/1991 |
| CN | 100437156 C | 11/2008 |

(Continued)

OTHER PUBLICATIONS

ASTM. "D4956-17". Oct 2017. (Year: 2017).*
(Continued)

*Primary Examiner* — Zhihan Zhou
(74) *Attorney, Agent, or Firm* — Patterson Thuente Patterson, P.A.

(57) ABSTRACT

A two-layer retroreflective article construction is enabled that produces higher wide-entrance-angle performance for signs and pavement markings. A single-layer overlay is enabled for existing signs and pavement markers that improve their entrance angle performance. Materials used in the construction of an article or an overlay are transparent to radiation in the range of 400 to 1000 nanometers and utilize TIR (total internal reflection). Minimum performance specifications are proposed that extend sign sheeting retroreflectivity specifications to entrance angles of 60 degrees. An innovative traffic sign design is enabled that increases the positioning performance of safety systems and automated navigation systems.

5 Claims, 24 Drawing Sheets

(51) Int. Cl.
*E01F 9/512* (2016.01)
*G02B 5/124* (2006.01)
*G02B 27/01* (2006.01)

(52) U.S. Cl.
CPC .... *G02B 27/0101* (2013.01); *G02B 2027/014* (2013.01); *G02B 2027/0138* (2013.01); *G02B 2027/0141* (2013.01)

(56) References Cited

U.S. PATENT DOCUMENTS

| | | |
|---|---|---|
| 3,712,706 A | 1/1973 | Stamm |
| 3,810,804 A | 5/1974 | Rowland |
| 3,924,929 A | 12/1975 | Holmen et al. |
| 3,946,130 A | 3/1976 | Tung et al. |
| 3,975,083 A | 8/1976 | Rowland |
| 4,025,159 A | 5/1977 | McGrath |
| 4,066,331 A | 1/1978 | Lindner |
| 4,123,140 A | 10/1978 | Ryan et al. |
| 4,145,112 A | 3/1979 | Crone et al. |
| 4,202,600 A | 5/1980 | Burke et al. |
| 4,208,090 A | 6/1980 | Heenan |
| 4,243,618 A | 1/1981 | Van Arnam |
| 4,349,598 A | 9/1982 | White |
| 4,576,850 A | 3/1986 | Martens |
| 4,588,258 A | 5/1986 | Hoopman |
| 4,712,868 A | 12/1987 | Tung et al. |
| 4,775,219 A | 10/1988 | Appeldorn et al. |
| 4,895,428 A | 1/1990 | Nelson et al. |
| 5,450,235 A | 9/1995 | Smith et al. |
| 5,571,362 A | 11/1996 | Hachey et al. |
| 5,679,437 A | 10/1997 | Hackworth et al. |
| 5,691,846 A | 11/1997 | Benson, Jr. et al. |
| 5,782,993 A | 7/1998 | Ponewash |
| 6,127,020 A | 10/2000 | Bacon, Jr. et al. |
| 6,155,689 A | 12/2000 | Smith |
| 6,172,810 B1 | 1/2001 | Fleming et al. |
| 6,287,670 B1 | 9/2001 | Benson et al. |
| 6,287,680 B1 | 9/2001 | Sasaki et al. |
| 6,470,610 B1 | 10/2002 | Northey |
| 6,540,367 B1 | 4/2003 | Benson et al. |
| 6,800,574 B2 | 10/2004 | Anderson |
| 6,883,921 B2 | 4/2005 | Mimura et al. |
| 6,967,053 B1 | 11/2005 | Mullen et al. |
| 7,045,475 B2 | 5/2006 | Senturk et al. |
| 7,075,718 B2 | 7/2006 | Suzuki et al. |
| 7,156,527 B2 | 1/2007 | Smith |
| 7,168,815 B2 | 1/2007 | Shipman et al. |
| 7,784,952 B2 | 8/2010 | Yukawa et al. |
| 7,995,039 B2 | 8/2011 | Eliasson et al. |
| 8,057,043 B2 | 11/2011 | Maekawa |
| 8,269,202 B2 | 9/2012 | Backes |
| 8,434,872 B2 | 5/2013 | Maekawa |
| 8,469,578 B2 | 6/2013 | Cornelissen et al. |
| 8,496,339 B2 | 7/2013 | Nakajima |
| 8,513,322 B2 | 8/2013 | Wright et al. |
| 8,570,393 B2 | 10/2013 | Moed et al. |
| 8,591,044 B2 | 11/2013 | Budd et al. |
| 8,651,720 B2 | 2/2014 | Sherman et al. |
| 8,783,879 B2 | 7/2014 | Smith et al. |
| 8,915,635 B2 | 12/2014 | Fiorentino et al. |
| 9,182,525 B2 | 11/2015 | Kim et al. |
| 9,294,754 B2 | 3/2016 | Billerbeck et al. |
| 9,335,255 B2 | 5/2016 | Retterath et al. |
| 9,470,822 B2 | 10/2016 | Smith |
| 9,551,475 B2 | 1/2017 | Sherman et al. |
| 9,575,225 B2 | 2/2017 | Kim |
| 9,651,721 B2 | 5/2017 | Chapman |
| 9,670,091 B2 | 6/2017 | Ryu et al. |
| 9,703,023 B2 | 7/2017 | Smith et al. |
| 9,709,349 B2 | 7/2017 | Raman et al. |
| 9,746,591 B2 | 8/2017 | Lu et al. |
| 9,790,372 B1 | 10/2017 | Greer et al. |
| 9,866,816 B2 | 1/2018 | Retterath |
| 9,910,194 B2 | 3/2018 | Free et al. |
| 9,923,111 B2 | 3/2018 | Fan et al. |
| 9,964,676 B2 | 5/2018 | Nagahama et al. |
| 9,971,074 B2 | 5/2018 | Chatterjee et al. |
| 10,088,251 B2 | 10/2018 | Raman et al. |
| 10,218,913 B2 | 2/2019 | Somasundaram et al. |
| 10,298,908 B2 | 5/2019 | Retterath |
| 10,382,742 B2 | 8/2019 | Retterath |
| 10,623,716 B2 | 4/2020 | Retterath |
| 2003/0123931 A1 | 7/2003 | Khieu et al. |
| 2006/0087735 A1 | 4/2006 | Nilsen et al. |
| 2008/0036356 A1 | 2/2008 | Ward et al. |
| 2012/0092756 A1 | 4/2012 | Yoshida et al. |
| 2016/0011346 A1 | 1/2016 | Vasylyev |
| 2016/0018582 A1 | 1/2016 | Fiorentino et al. |
| 2016/0209559 A1 | 7/2016 | McCarthy et al. |
| 2017/0193312 A1* | 7/2017 | Ai .................... G06F 13/20 |
| 2017/0243913 A1 | 8/2017 | Lee et al. |
| 2017/0257617 A1 | 9/2017 | Retterath |
| 2018/0017679 A1 | 1/2018 | Valouch et al. |
| 2018/0117863 A1 | 5/2018 | Smith et al. |
| 2018/0196194 A1 | 7/2018 | Fattal |
| 2018/0214023 A1 | 8/2018 | Chen et al. |
| 2018/0295344 A1 | 10/2018 | Retterath |
| 2019/0058867 A1 | 2/2019 | Retterath |
| 2019/0101751 A1* | 4/2019 | Chou .................. G09G 5/14 |
| 2019/0163992 A1* | 5/2019 | Mahon .................. H04N 9/04 |
| 2019/0364262 A1 | 11/2019 | Retterath |
| 2020/0036958 A1 | 1/2020 | Retterath |

FOREIGN PATENT DOCUMENTS

| | | |
|---|---|---|
| CN | 101672939 B | 6/2011 |
| CN | 101561523 B | 9/2011 |
| CN | 102354009 A | 2/2012 |
| CN | 101952747 B | 9/2012 |
| CN | 203623051 U | 6/2014 |
| CN | 204898550 U | 12/2015 |
| DE | 102007003766 B4 | 9/2008 |
| EP | 0879430 B1 | 9/2003 |
| EP | 0988573 B1 | 8/2004 |
| EP | 1053490 B1 | 3/2005 |
| EP | 1136847 B1 | 7/2005 |
| EP | 1166159 B1 | 2/2006 |
| EP | 2020348 B1 | 8/2016 |
| GB | 2546265 A | 7/2017 |
| JP | 3834596 B2 | 10/2006 |
| JP | 4009751 B2 | 11/2007 |
| JP | 6512868 B2 | 5/2019 |
| KR | 10-0459779 B1 | 12/2004 |
| KR | 10-2008-0066063 A | 7/2008 |
| KR | 10-2010-0009432 A | 1/2010 |
| WO | WO 2012/088921 A1 | 7/2012 |
| WO | WO 2017/007816 A1 | 1/2017 |
| WO | WO 2017/093453 A1 | 6/2017 |

OTHER PUBLICATIONS

ASTM, "D1746-15, Standard Test Method for Transparency of Plastic Sheeting," ASTM International, 2019, www.astm.org.
Johnson, "High Temperature Thermoplastics," ThoughtCo., Jul. 21, 2018, 3 pages.
Land Infrared, "Temperature Measurement with Infrared Thermometers," 43 pages.
Wikipedia, "Sellmeier Equation," 3 pages.
Application and File history for U.S. Appl. No. 16/563,523, filed Sep. 6, 2019. Inventors: Retterath.
Application and File history for U.S. Appl. No. 16/863,511, filed Apr. 30, 2020. Inventors: Retterath.

* cited by examiner

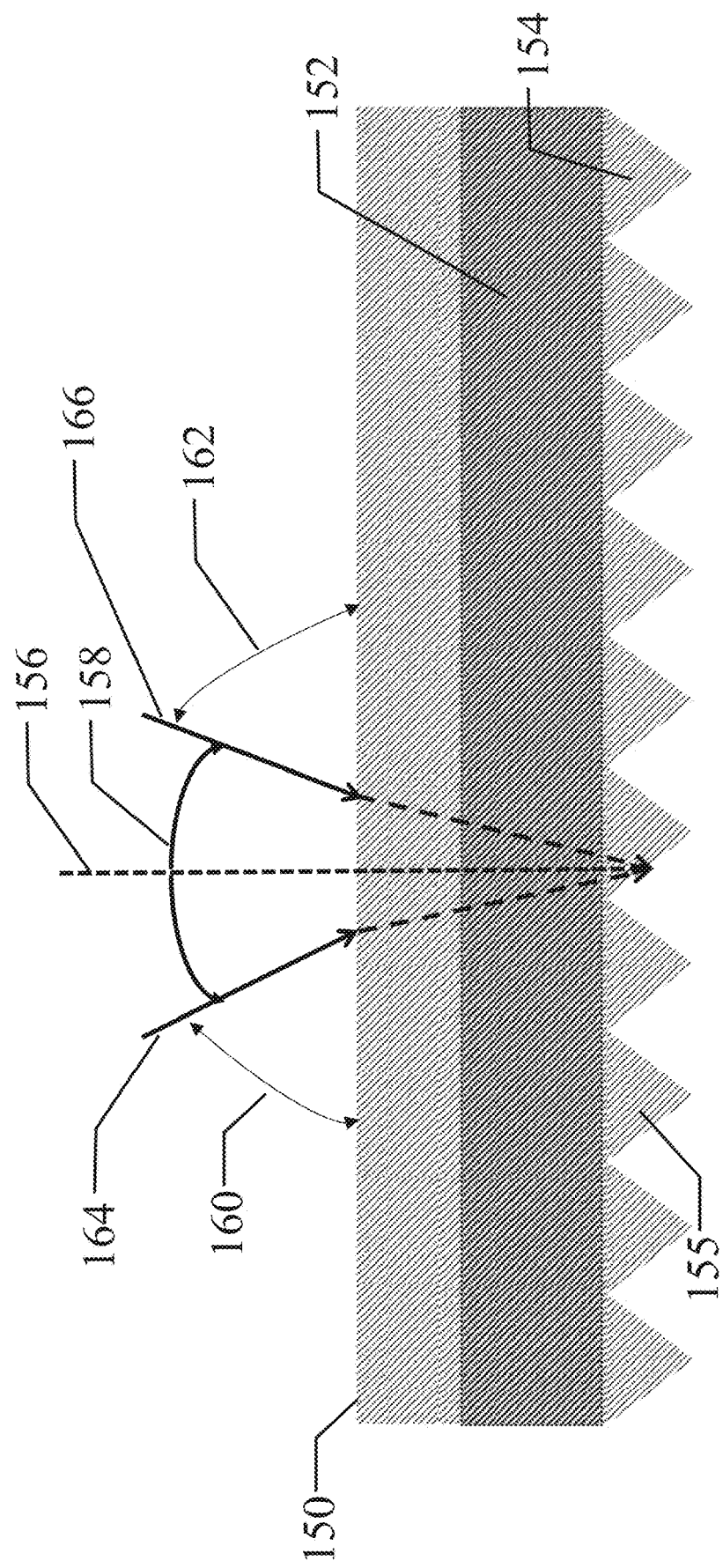

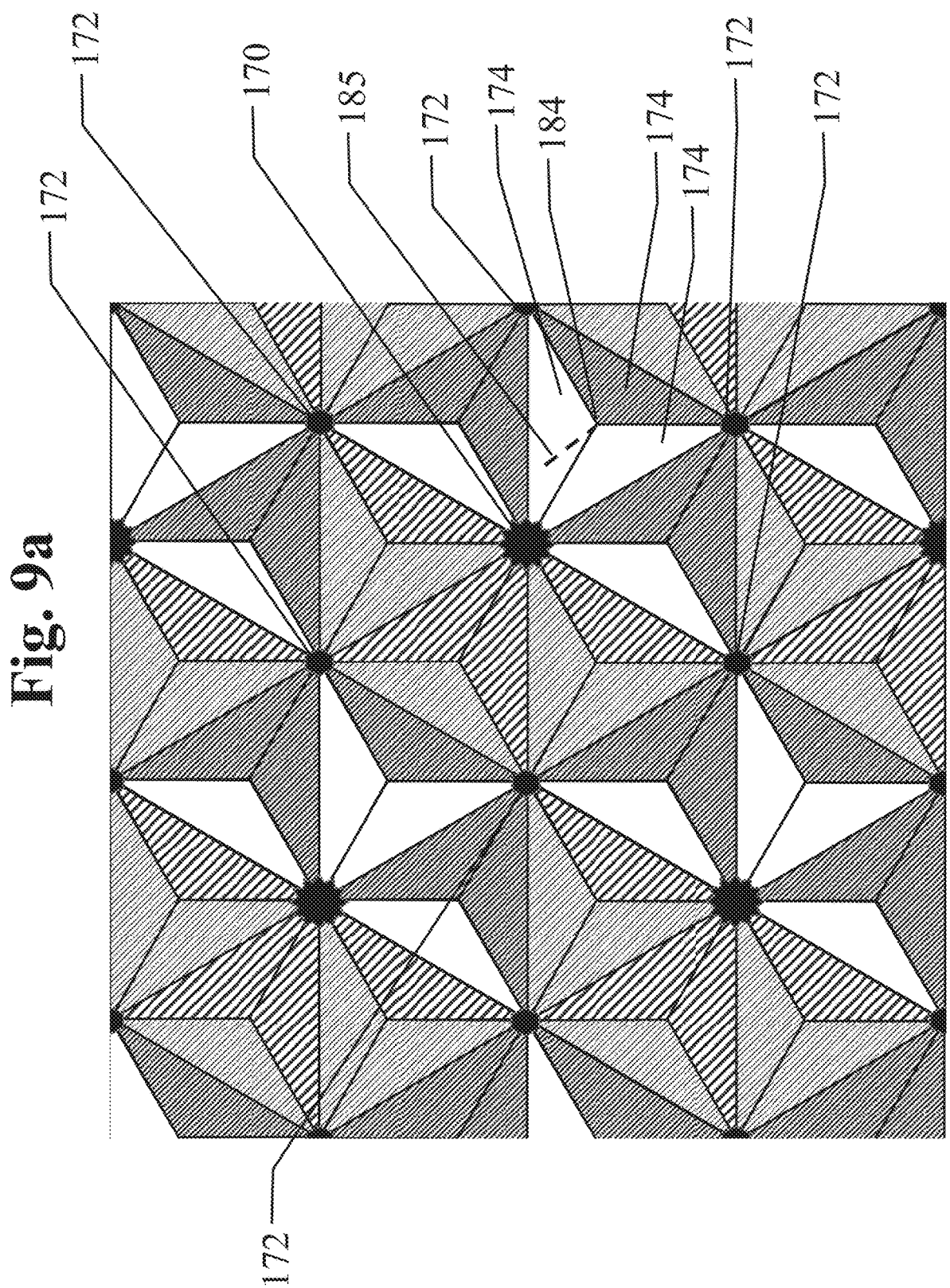

METHODS AND APPARATUS FOR ULTRAWIDE ENTRANCE ANGLE REFLECTIVE ARTICLES FOR USE WITH AUTONOMOUS VEHICLE MACHINE VISION SYSTEMS

PRIORITY

This application claims priority to U.S. Provisional Applications Nos. 62/718,183 and 62/753,207, the contents of which are hereby incorporated by reference.

FIELD OF THE INVENTION

The present disclosure relates generally to optical elements that are reflective, such as reflective road markers. More particularly, the present disclosure relates to sign sheeting and pavement marking materials that produce higher levels of net retroreflectivity at larger entrance angles and over a broader electromagnetic spectrum.

BACKGROUND OF THE INVENTION

Retroreflective sheeting is often used in roadway signs and conspicuity garments to increase nighttime visibility. Retroreflective adhesive materials are used as pavement markers and vehicle reflectors. Such retroreflective sheeting and materials typically comprise a layer of transparent material having a substantially smooth front surface, and a rear surface provided with a plurality of retroreflective elements. The most common retroreflective elements are beads or similar spherical elements having a different index of refraction than the transparent material, or retroreflective geometric features, such as a series of trihedral-shaped features referred to as cube corners because of the internal corner that is formed by the three mutually perpendicular flat surfaces of the trihedral structure.

Retroreflectivity is a ratio of the amount of light returned from a surface versus the amount of light hitting that surface. The retroreflective elements in retroreflective sheeting and materials enhance retroreflectivity by utilizing the phenomenon of total internal reflection (TIR). TIR occurs when a propagated wave internally strikes a medium boundary at an angle of incidence relative to a line perpendicular or normal to the boundary where the propagated wave strikes the boundary that is larger than a particular critical angle with respect to the normal to the boundary of that medium. The critical angle is the angle of incidence above which the TIR occurs and is a function of the relative difference between the indices of refraction of the two different materials that define the boundary.

TIR is particularly common as an optical phenomenon, where light waves are involved, but it occurs with many types of waves, such as electromagnetic waves in general or sound waves. When a wave reaches a boundary between different materials with different refractive indices, part of the wave will be partially refracted at the boundary surface and part of the wave will be partially reflected. However, if the angle of incidence is greater than the critical angle—the angle of incidence at which light is refracted such that it travels along the boundary—then the wave will not cross the boundary but will instead be totally reflected back internally within that medium. This can only occur when the wave in a medium with a higher refractive index ($n_1$) reaches a boundary with a medium of lower refractive index ($n_2$).

Light beams or waves entering the front surface of a retroreflective sheeting or material are measured according to an entrance angle that, like an angle of incidence, is determined relative to a normal of the surface where the beam or wave enters the surface. Depending upon the entrance angle and the differences in the indices of refraction, the light beams may experience TIR internal to the medium of the retroreflective sheeting or material and are then completely reflected internally within the medium and back out in the direction from which the light beams came. Ideally, such retroreflective sheeting or material should be able to retroreflect light beams entering the front surface not only at low entrance angles that are near zero (i.e. in a direction near normal to the sheeting), but also at high entrance angles. Because the ability to internally reflect light at high entrance angles is dependent on the difference between the indices of refraction of the material forming the retroreflective elements and the material that interfaces with the back surface, many versions of retroreflective sheeting provide an air space behind the retroreflective elements in order to maximize this difference. However, even when such an air space is used, light entering the retroreflective elements beyond a certain critical angle will leak out as partially refracted light, thereby reducing the retroreflectivity of the sheeting. Air spaces behind the reflective base material can also cause problems with durability and with the infusion of foreign, life-reducing materials.

To overcome these shortcomings, retroreflective sheeting has been developed that employs, in lieu of air spaces, a solid backing layer having an index of refraction that is lower than the index of refraction of the material used to form the retroreflective elements. While such sheeting is structurally sounder and stronger than comparable sheeting employing air spaces behind the retroreflective elements, the ability of such sheeting to provide TIR for a broad range of entrance angles is significantly less than that of air-backed articles because the difference in the index of refraction between the material forming the retroreflective elements and the material forming the solid backing layer is less. For example, if the retroreflective elements are cube corners formed from polycarbonate having an index of refraction n=1.59, and the solid backing material is cryolite having an index of refraction of n=1.32, the difference between the indices of refraction is 1.59−1.32=0.27. By contrast, when the backing layer is formed from air having an index of refraction n=1.00, the difference between the indices of refraction is 1.59−1.00=0.59 which is more than twice as much as 0.27.

To increase the critical angle for TIR, materials having an index of refraction lower than cryolite have been used in such retroreflectors. For example, a thin optical film formed from particulate metal oxide such as silicon dioxide or alumina mixed with a binder has been applied as a backing layer to retroreflective sheeting. The resulting backing layer is characterized by nanoporosity and can have an index of refraction as low as 1.10.

Another approach to increase the entrance angle at which a retroreflector exhibits some degree of retroreflectivity is to apply a reflective metallic layer such as vacuum-deposited aluminum to the back surface. In such a structure, when light enters the cube corners, for example, it exhibits specular reflection off of the metallic layer when it reaches the faces of the cube corners, and is retroreflected back toward its source, even when entering at angles beyond the critical angle for TIR in an air-backed structure. In addition to increasing the entrance angle at which the retroreflector exhibits some degree of retroreflectivity, metallization provides a seal over the back surface of the retroreflective elements that prevents TIR-destroying dirt and moisture from lodging on the back surfaces which would in turn degrade or destroy the ability of the retroreflective elements to provide TIR.

Unfortunately, metallization has the disadvantage of reducing the overall retroreflectance of the article. Unlike TIR, for which reflectance is 100%, aluminum has a reflectance of only about 85%. Consequently, the intensity of a retroreflected ray of light that is reflected off of three aluminized faces is reduced to about $(85\%)^3$ or roughly 61% of its corresponding TIR intensity.

Illustrative examples of cube corner type retroreflectors are disclosed in U.S. Pat. No. 3,541,606 (Heenan), U.S. Pat. No. 3,712,706 (Stamm), U.S. Pat. No. 3,810,804 (Rowland), U.S. Pat. No. 4,025,159 (McGrath), U.S. Pat. No. 4,202,600 (Burke), U.S. Pat. No. 4,243,618 (Van Arnam), U.S. Pat. No. 4,349,598 (White), U.S. Pat. No. 4,576,850 (Martens), U.S. Pat. No. 4,588,258 (Hoopman), U.S. Pat. No. 4,775,219 (Appeldorn), U.S. Pat. No. 4,895,428 (Nelson), U.S. Pat. No. 5,450,235 (Smith), U.S. Pat. No. 5,691,846 (Benson), U.S. Pat. No. 6,470,610 (Northey), U.S. Pat. No. 6,540,367 (Benson), U.S. Pat. No. 7,156,527 (Smith), and U.S. Pat. No. 9,703,023 (Smith).

Various attempts have been made to produce retroreflectors that enhance performance and/or improve on the entrance angles at which TIR occurs. U.S. Pat. No. 6,172,810 (Fleming) discloses wrapping the cube corners of a reflective layer within multiple layers of polymer coating material having different indices of refraction. U.S. Pat. No. 6,883,921 (Mimura) discloses specific packing and angular arrangements of cube corners within different zones of a reflective layer to improve entrance angle performance. U.S. Pat. No. 7,784,952 (Yukawa) discloses a sheeting material with improved entrance angle performance produced with embedded glass beads used as a focusing layer for a metal reflective layer on the back side of the focusing layer. U.S. Pat. No. 8,651,720 (Sherman) adds a viscoelastic light guide to some embodiments of retroreflective sheeting. U.S. Pat. No. 9,575,225 (Kim) discloses a step retroreflector for improved entrance angle performance by using a main cube corner with sub-reflective corners on a shared surface to increase performance in the axis orthogonal to the step retroreflector. U.S. Pat. No. 9,651,721 (Chapman) discloses increased entrance angle performance by increasing the difference between the indices of refraction a retroreflective layer and by lowering the index of refraction and providing nanopore structure in a backing material layer. U.S. Pat. No. 9,910,194 (Benton Free) discloses both optically active and inactive regions of the retroreflective sheeting. U.S. Pat. No. 9,971,074 (Chatterjee) discloses the addition of an amorphous polymeric layer between the body layer and the cube corner elements to increase brightness.

Most retroreflective articles used in connection with transportation applications have been optimized for nighttime detection in the visible spectrum, roughly 400-700 nanometers. With the advent of ADAS (Advanced Driver Assist Systems), ACC (Adaptive Cruise Control), LDW (Lane Departure Warning) Systems, LKS (Lane Keep Systems), and CAVs (Connected and Automated Vehicles), many automotive deployments are resorting to NIR (Near Infrared) active sensors to perform object sensing and detecting.

Various attempts have been made to enhance and/or provide selective retroreflective articles in different spectral ranges other than the visible spectrum. U.S. Pat. No. 8,496,339 (Nakajima) discloses an optical structure layer and a wavelength selective reflective layer to control the range of wavelength subject to retroreflection. U.S. Pat. No. 8,783,879 (Smith) teaches altering the performance characteristics of a cube corner design by introducing roughness into cube corner faces. U.S. Pat. No. 9,746,591 (Lu) discloses a multilayer retroreflective film that improves structural integrity by using a strengthening layer and buffering sections between retroreflective elements in the retroreflective layer. U.S. Pat. No. 9,964,676 (Nagahama) discloses a wavelength selective retroreflective material that includes a concavo-convex surface with first and second structural elements with different angles for aspects of the cube corners in the retroreflective layer.

Prior art pavement marking materials, and even road signage, can exhibit reduced performance in wet conditions due to varying optical paths for wet and dry conditions. Techniques used to increase performance for wet/dry pavement marking articles, for example, include approaches like adding glass or ceramic beads of different diameters to the article surface to account for varying optical paths for wet and dry conditions. This construction increases the cost of the article and reduces the durability.

In view of the increased requirements for retroreflective articles designed for use with autonomous vehicle machine visions systems, there is a need for new approaches to the design, construction and use of retroreflective articles that can improve both daytime and nighttime performance, can be applicable to both visible and NIR spectrums, and/or can provide more consistent performance in different environmental conditions.

SUMMARY OF THE INVENTION

In embodiments, ultrawide angle reflective articles and materials are enabled that effectively increase the entrance angle range for which the articles exhibit total internal reflection (TIR) thereby increasing the net retroreflectivity of these articles and materials. Articles and materials that exhibit TIR over ultrawide angle ranges produce a net increase in retroreflectivity versus articles or materials that rely on specular or diffuse reflection for repelling or directing electromagnetic radiation. Articles and materials with ultrawide angle ranges of TIR also exhibit improved reflective efficiency across a broader spectrum of electromagnetic radiation and in different environmental conditions.

In various embodiments, ultrawide angle reflective articles or materials have multiple retroreflective layers. A base retroreflective layer is provided for reflecting electromagnetic radiation at low entrance angles and can utilize retroreflective elements that rely on conventional TIR or other retroreflection techniques. A mezzanine retroreflective layer is provided with tilted cube corner elements that enable TIR for reflecting electromagnetic radiation at higher entrance angles but are bi-directionally transmissive for electromagnetic radiation at lower entrance angles. Additional optical and backing layers can be provided in addition to the base and mezzanine retroreflective layers. In some embodiments, the multiple retroreflective layers are combined in an integrated article or material. In other embodiments, the mezzanine retroreflective layer is provided as an overlay to be applied to an existing retroreflective article or materials that then serves as the base layer of the ultrawide angle reflective article or material.

In embodiments, reflective traffic sign sheeting is enabled with improved entrance angle performance based on extending the ultrawide range of angles that exhibit TIR. Medium materials for sign sheeting exhibit properties that include high or total transparency to the wavelength of radiation utilized with the article and a sufficiently high index of refraction to support TIR at ultrawide entrance angles with ranges greater than, for example, in some embodiments +/−35 degrees from normal and in other embodiments +/−60 degrees from normal. Base materials for sign sheeting exhibit a sufficiently low index of refraction to support TIR at the desired entrance angles. The combination of the tilted geometric structure of the TIR portion of the mezzanine layer and the normal geometric structure of the base layer provides increased TIR ultrawide angle performance over traditional and prior art geometries.

In embodiments, ultrawide angle reflective sheeting is enabled that exhibits sufficient flexibility to allow the production, shipping and storage of materials in rolled form. Flexible sheeting can also be used for adherence to non-flat surfaces. In embodiments, flexible sheeting is enabled with medium materials that exhibit the desired flexibility of the manufactured article.

In embodiments, an overlay for existing sign sheeting material is enabled with improved entrance angle performance based on the ultrawide range of entrance angles that exhibit TIR. In embodiments, a mezzanine layer overlay exhibits flexibility allowing it to be manufactured, packed, and shipped in roll form.

In embodiments, reflective roadway pavement marking material is enabled with improved entrance angle performance due to increasing the ultrawide range of entrance angles that exhibit TIR. In embodiments, reflective pavement marking materials are enabled that, upon installation on a roadway, have a substantially flat upper surface that exhibits TIR for ultrawide entrance angles. The ultrawide angle TIR performance range of embodiments is essentially similar for both dry and wet roadway conditions.

In embodiments, an ultrawide angle reflective pavement marking is enabled that exhibits sufficient flexibility to allow the production, shipping, and storage of materials in rolled form. A flexible pavement marking is enabled for adherence to a non-flat surface. In embodiments, a flexible pavement marking material is enabled with a medium material that exhibits the desired flexibility of the manufactured article.

In embodiments, a fiducial traffic sign design and layout is enabled that, when broadly deployed and integrated into a vehicle safety system, can facilitate reduced traffic accidents, fewer vehicle operator fatalities, and improved optical interaction between a roadway infrastructure and a human vehicle operator. In embodiments, a fiducial traffic sign design and layout is enabled that, when broadly deployed and integrated into an autonomous or semi-autonomous vehicle safety system, can facilitate reduced traffic accidents and improved electromagnetic wave interaction between a roadway infrastructure and vehicle-based machine vision sensors.

With the advent of vehicle-based machine vision sensors that outperform the human vision system, vehicle safety system functionality will include the presentation of sensed roadway elements to a human vehicle operator. In embodiments, a Heads-up Display (HUD) is enabled that presents an image of a vertically-oriented fiducial sign detected along a roadway. The location, size, and orientation of the fiducial sign would appear on the HUD appreciably similar to the vehicle operator as the non-blocked or non-attenuated optical view an operator would experience through a windshield in a vehicle traversing a roadway. Potential scenarios whereby the presentation of a fiducial sign on a HUD would increase vehicle safety could include, but not be limited to a heavy rain environment, atmospheric conditions that include eyesight-limiting or eyesight-blocking fog or dust, and vehicle operators with reduced or compromised eyesight.

Horizontally-oriented roadway elements like pavement markers and road edges can experience reduced optical detection and complete optical blockage to vehicle-based optical sensor systems. In embodiments, an electronic map with precisely-positioned roadway elements that include fiducial signs is used to present the optically-blocked roadway elements on a HUD in a proper location, size, and orientation so a human vehicle operator can utilize the displayed and projected roadway elements to accurately and safely operate a vehicle.

BRIEF DESCRIPTION OF THE DRAWINGS

FIG. 8 illustrates a cross-sectional view for a reflective article in accordance with an embodiment of the present invention having a base retroreflective layer and a mezzanine retroreflective layer.

FIG. 9A illustrates a plan view for tilted apex axis cube corner retroreflective features for an embodiment of the mezzanine reflective layer as shown in FIG. 8.

DETAILED DESCRIPTION OF THE EMBODIMENTS

Figure 1:
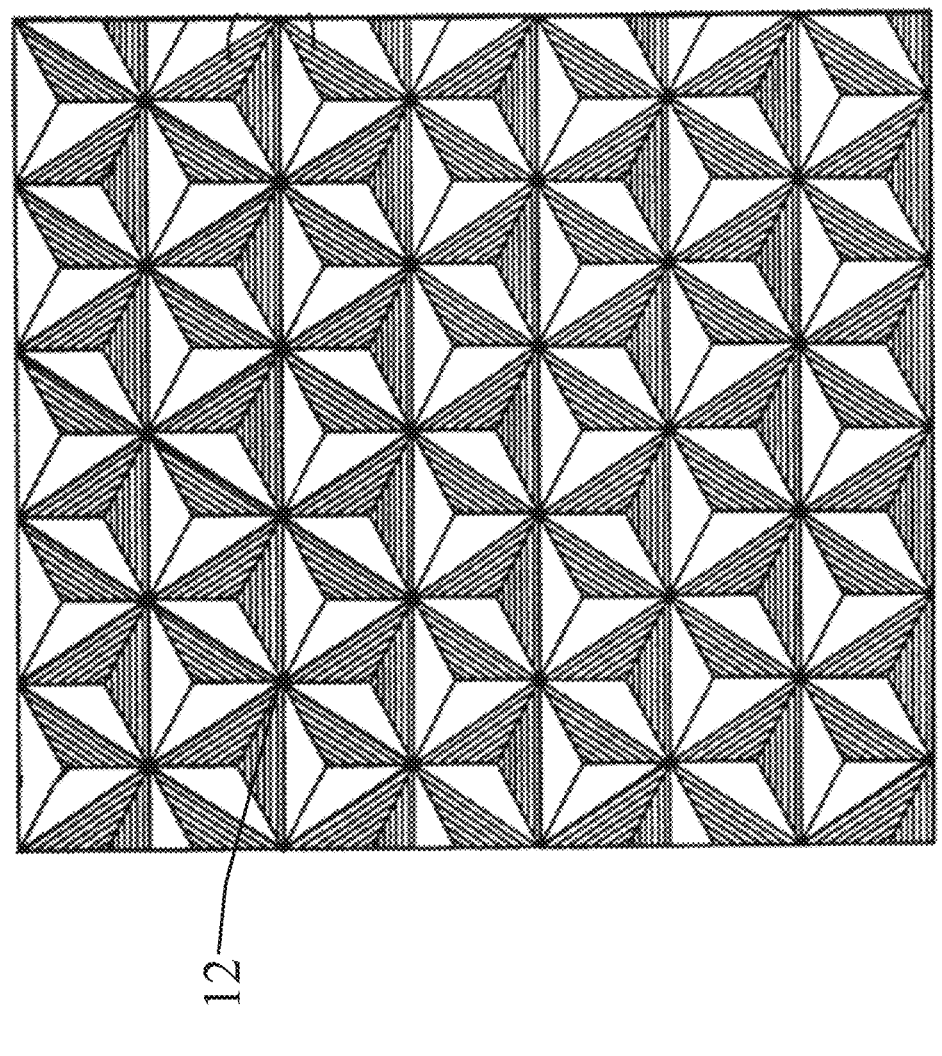
FIG. 1 illustrates a plan view of a prior art cube corner retroreflective sheeting.
Figure 2:
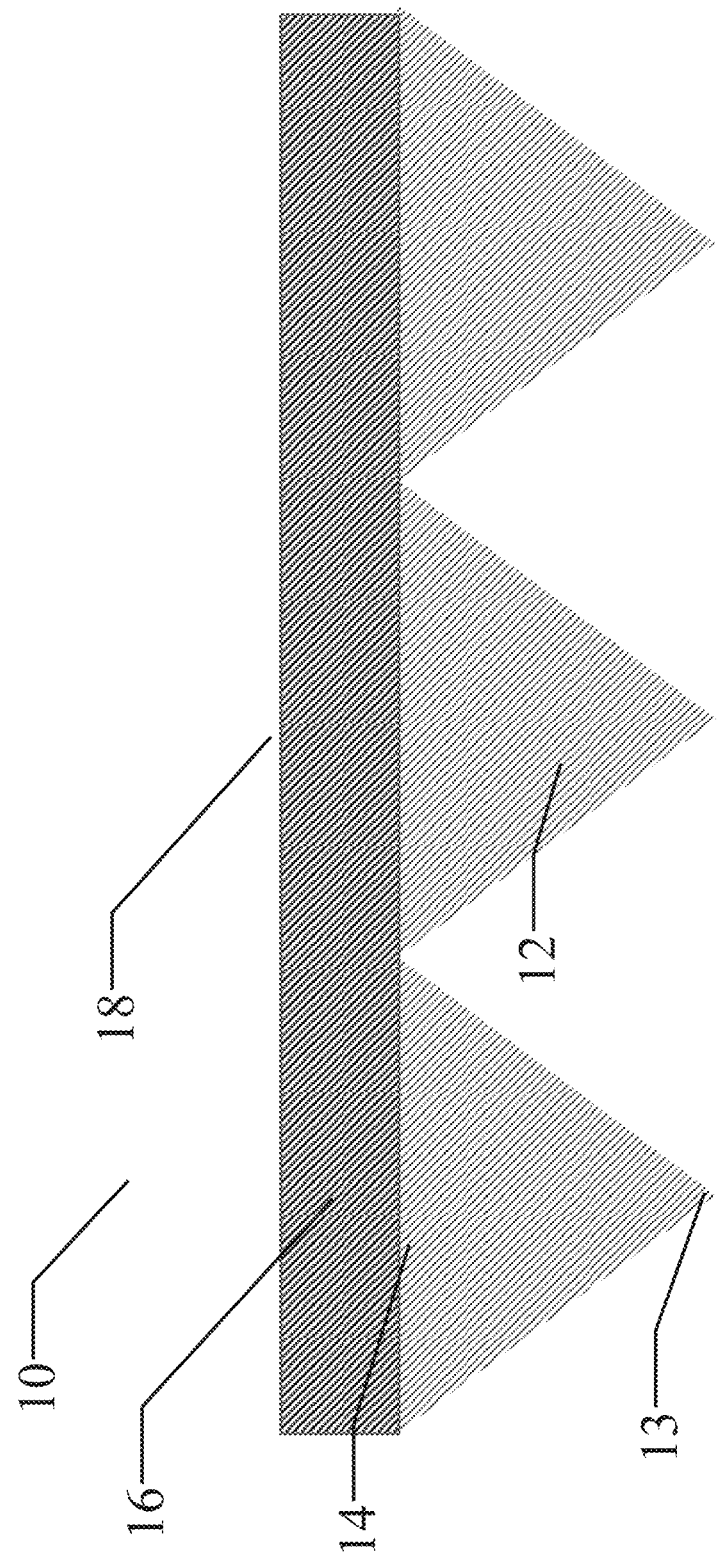
FIG. 2 illustrates a cross-sectional view of the prior art sheeting of FIG. 1.

FIGS. 1 and 2 illustrate a portion of a typical replicated cube corner retroreflective sheet 10 known in the prior art. Referring to both FIGS. 1 and 2, reference 12 generally designates one of the minute cube corner elements of formations prism features disposed in an array on one side of sheeting 10. Each retroreflective element 12 has the shape of a trihedral prism with three exposed planar faces, substantially perpendicular to one another, and an apex axis defined by a line intersecting the apex of the trihedral prism that is equidistant to each of the planar faces. The angle between the faces of the trihedral prism is the same for each cube corner element in the array and will be about 90 degrees.

As is illustrated in FIG. 2, cube corner elements 12 in sheet 10 can be all of the same dimensions and aligned in an array or pattern of rows and columns, the bases being in the same plane, and adjacent elements being contiguous at the edges of their bases such that there are no margins or flats between adjacent elements or spaced apart as desired. If desired, different elements in the array may have varying dimensions and orientations.

Body portion 16 is preferably integral with cube corner optical elements 12, constituting what is referred to as a land that defines a front surface 18 into which electromagnetic radiation enters. The dimensions of the land portion of the sheeting relative to the individual cube corner optical elements will vary depending on the material of the medium of the sheeting, the method chosen for manufacture and, ultimately, the end purpose of the sheeting.

It is helpful to note that the trihedral prism elements 12 in cross-sectional FIG. 2 are shown as effectively being upside-down from a conventional pyramid in that the apex 13 is below the base 14 which is operably connected to the body portion 16. The triangular structure of the trihedral prism element 12 that provides the total internal reflection (TIR) phenomenon is the inverted shaded shape shown in this cross-section as the figure portion of a figure-ground representation, and not the corresponding unshaded upright triangular shape that is effectively the ground portion in this representation.

Cube corner elements of the prior art produce retroreflection due to TIR. Faces of cube corner elements will produce TIR when rays, beams, or electromagnetic waves strike the internal boundaries of the medium forming the retroreflective elements at an angle of incidence greater than the critical angle. The critical angle is measured from the normal vector to each boundary. For retroreflective articles and materials, it is common to refer to the angle of the incoming rays, beams or electromagnetic waves that strike the front surface of the material or article as being the entrance angle, whereas the angles of the ray, beam or wave as it propagates internally within the medium and encounters one or more additional boundaries, such as the face of a cube corner, are referred to as the incidence angles or angles of incidence.

Figure 3:
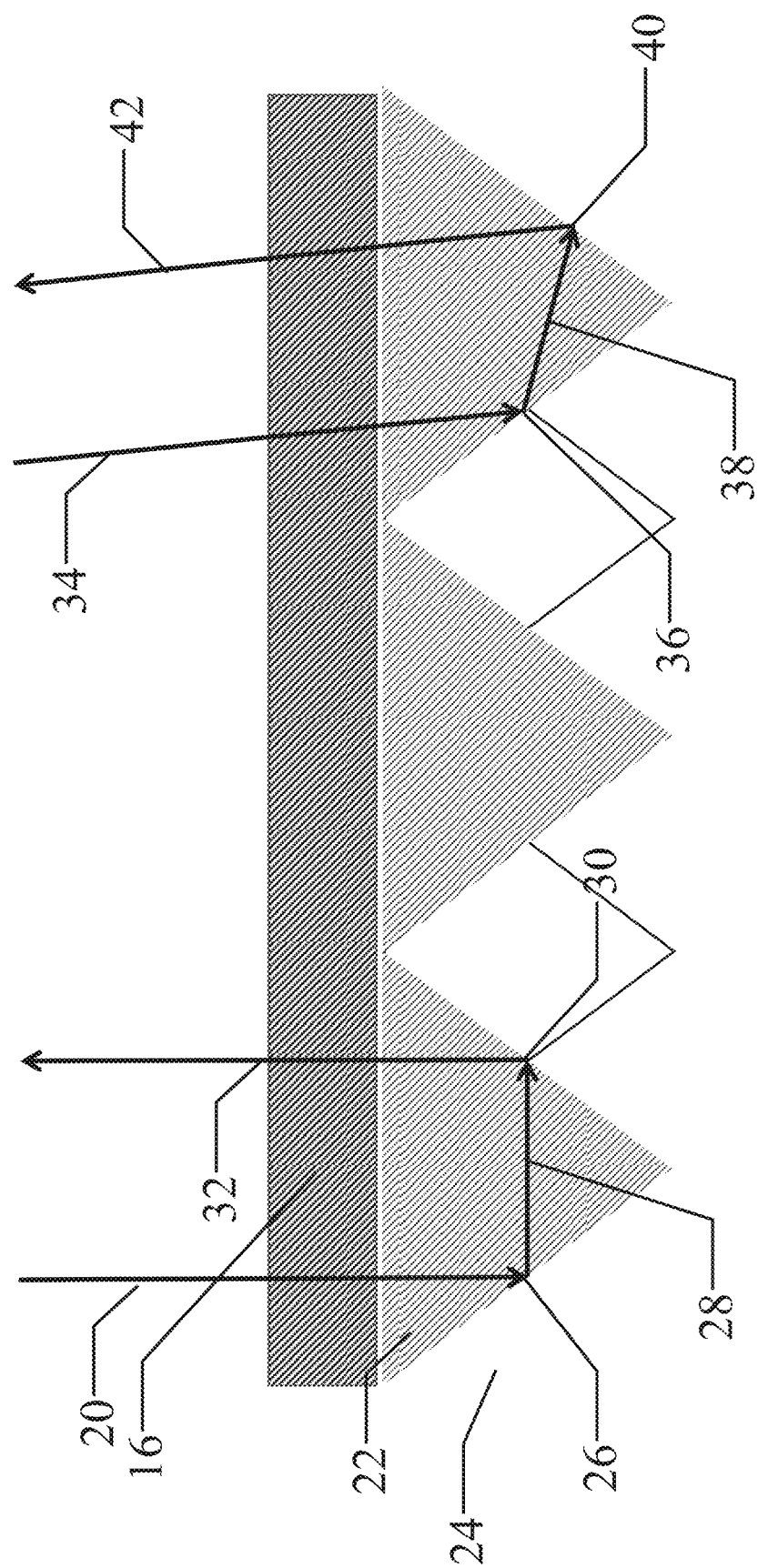
FIG. 3 illustrates paths of light travel for TIR reflected rays for the prior art sheeting of FIG. 2.

FIG. 3 shows two examples of incoming light rays 20, 34 that experience total internal reflection (TIR) at the surfaces of the cube corner elements of prior art retroreflective articles. The first ray 20 enters the front surface of the reflective material essentially parallel to the normal vector of the reflective material surface and travels through a medium 22 with a higher index of refraction than the backing material 24 at a point 26 on the boundary of the backing material. Because the incident angle is greater than the critical angle, TIR projects the reflected ray 28 toward a second face of the cube corner element. Upon meeting the second face of the cube corner element, the ray 28 experiences TIR at point 30 and is completely reflected along ray 32. Rays 20 and 32 are essentially parallel and in opposite directions, thus providing TIR retroreflectivity.

In contrast to light ray 20 which was perpendicular to the front surface, light ray 34 is non-parallel to the normal vector for the point at which light ray 34 intersects the front surface of the reflective material. Because light ray 34 encounters the cube corner boundary at point 36 at an incidence angle greater than the critical angle, light ray 34 also experiences TIR. The reflected ray 38 encounters the second cube corner face at point 40 at an incidence angle greater than the critical angle, also experiencing TIR. Rays 34 and 42 are essentially parallel and in opposite directions, thus providing TIR retroreflectivity.

Figure 4:
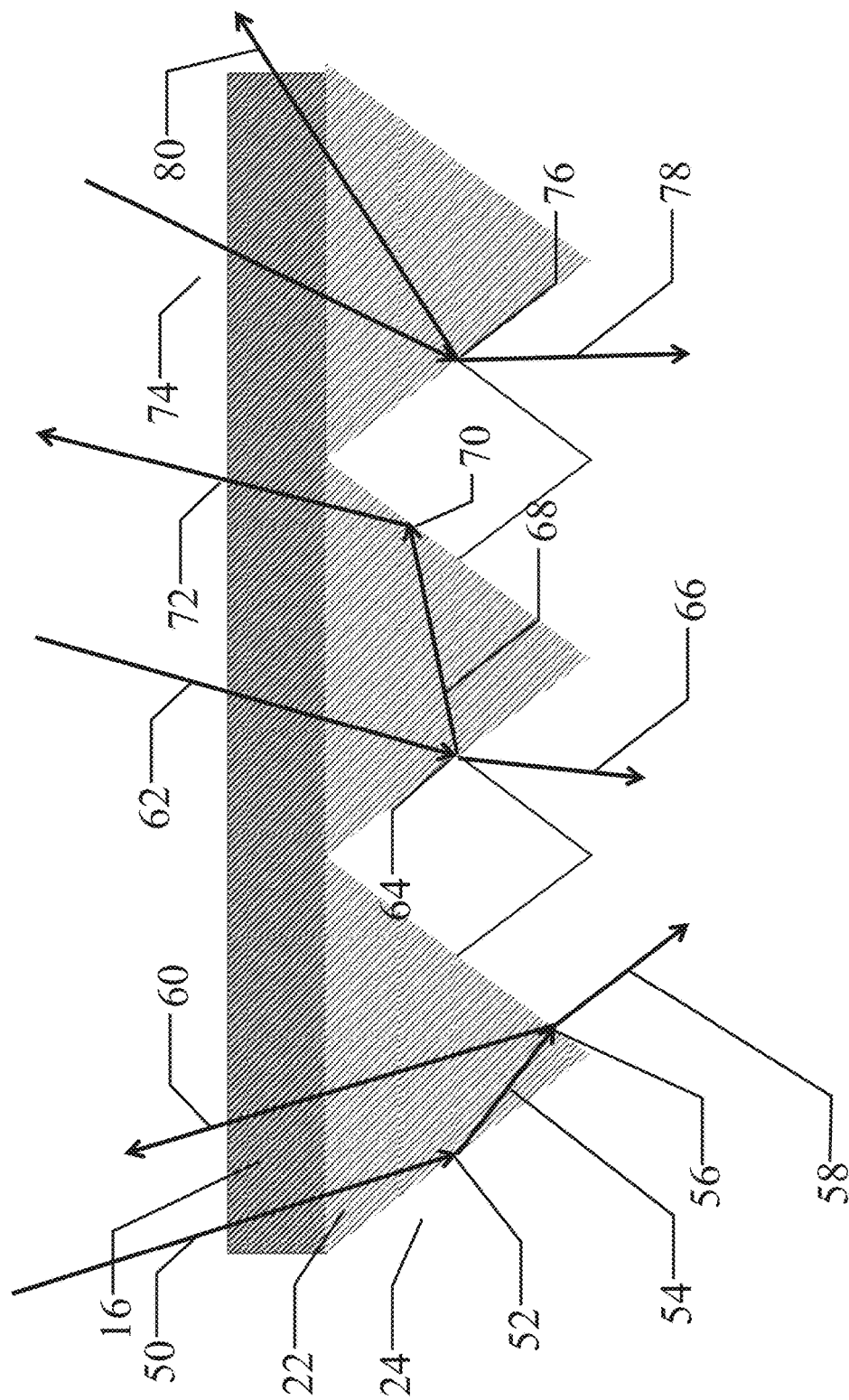
FIG. 4 illustrates paths of light travel for mixed TIR and specular reflected rays for the prior art sheeting of FIG. 2.

FIG. 4 shows examples of rays 50, 62, 74 that experience retroreflective loss due to incident angles that are less than the critical angle and therefore do not conform to the geometry of TIR in prior art retroreflective articles.

In a first example, ray 50 strikes the front surface of the medium at an entrance angle that is less than the critical angle and so enters the medium. After ray 50 enters the medium it encounters the first cube corner face at point 52 at an incidence angle greater than the critical angle and experiences complete internal reflection off of the first cube corner face. The reflected ray 54 encounters the subsequent cube corner face at point 56 at an incidence angle that is less than the critical angle. Unlike the interaction with the first cube corner face, the internal interaction with the second cube corner face causes a portion of the reflected ray 54 to refract through the barrier along ray 58 and a portion of the reflected ray 54 to experience specular reflection along ray 60. As a result, even though there was complete reflection caused by the interaction with the first cube face, there is not TIR because the interaction with the second cube face did not result in complete internal reflection.

As a second example in FIG. 4, incoming ray 62 strikes the front surface of the medium at an entrance angle that is less than the critical angle and so enters the medium. After ray 62 enters the medium it encounters the cube corner face at point 64 at an incidence angle that is less than the critical angle. A portion of the incident ray 62 refracts through the barrier along ray 66 and a portion of the incident ray 62 experiences specular reflection along ray 68. Reflected ray 68 encounters the cube corner at point 70 and experiences complete internal reflection along ray 72 because the angle is greater than the critical angle. The retroreflected ray 72 is parallel to and in the opposite direction of the incident ray. Its intensity, however, is less than the intensity of a full TIR path because of the loss due to specular refraction that occurred at point 64.

As a third example in FIG. 4, incident ray 74 strikes the front surface of the medium at an entrance angle that is less than the critical angle and so enters the medium. After ray 74 enters the medium it encounters a cube corner surface at point 76 at an angle that is less than the critical angle. A portion of the incident ray 74 refracts through the barrier along ray 78 and a portion of the reflected ray 54 experiences specular reflection along ray 80. Because the reflected ray does not encounter a second surface of the cube corner, the direction of the ray 80 as it exits the medium is non-parallel to the incident ray 74 and produces little or no retroreflectivity.

Figure 5:
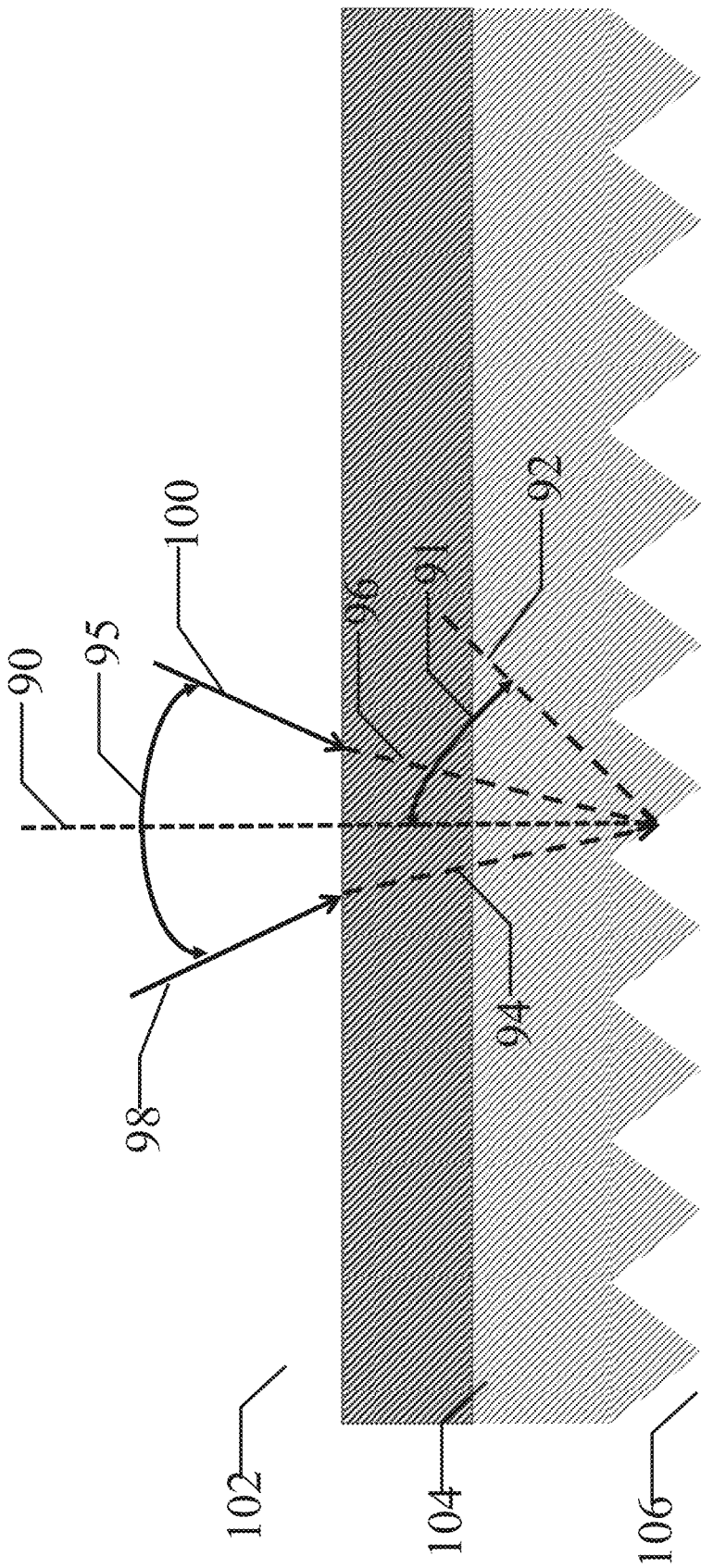
FIG. 5 illustrates entrance angle performance for a cube corner design for the prior art sheeting of FIG. 2.

TIR retroreflectivity for an article with a flat front surface and a cube corner back surface will be defined by the indexes of refraction of the medium that contains the article (typically air), the index of refraction of the material used to produce the article, and the index of refraction of the material behind the cube corner elements (also typically air). FIG. 5 shows the geometry for TIR for a typical prior art retroreflective article. The critical angle at the cube corner surface is referenced from the cube corner normal vector 92 and is defined by Snell's law:

$$\eta_1 * \sin\theta_1 = \eta_2 * \sin\theta_2 \qquad \text{Eq. 1}$$

where $\eta_1$ is the index of refraction of medium 1
$\theta_1$ is the angle of the wave in medium 1
$\eta_2$ is the index of refraction of medium 2
$\theta_2$ is the angle of the wave in medium 2

For a medium 104 made of a material having an index of refraction of 1.6 and with a cube corner backing 106 interfacing with air having an index of refraction 1.0, the critical angle at the cube corner surface equates to 38.7 degrees from the cube corner normal vector 92. The angle 91 between the cube corner normal 92 and the surface normal 90 is 45 degrees, so the internal range of TIR angles 94, 96 within the medium is defined as:

$$+/-(\text{cube-corner-normal}-\text{critical angle}) \qquad \text{Eq. 2}$$

or +/−6.3 degrees.

Incoming waves will be refracted when entering the front surface 102 of the medium 104 if the entrance angles are less than the critical angle. Using Eq. 1 and the index of refraction of the medium 104 and air as the medium interfacing with the front surface 102, the range 95 of TIR angles 98, 100 entering the medium 104 from air is +/−10.1 degrees.

To summarize FIG. 5 and the TIR geometry of a typical prior art cube corner-type of retroreflective article or material, a trihedral prism with three exposed planar faces in which an apex axis of the prism is parallel to the surface normal 90 will produce TIR when light waves have entrance angles relative to the surface normal 90 that are smaller than the range defined by ray 98 and ray 100.

Figure 6:
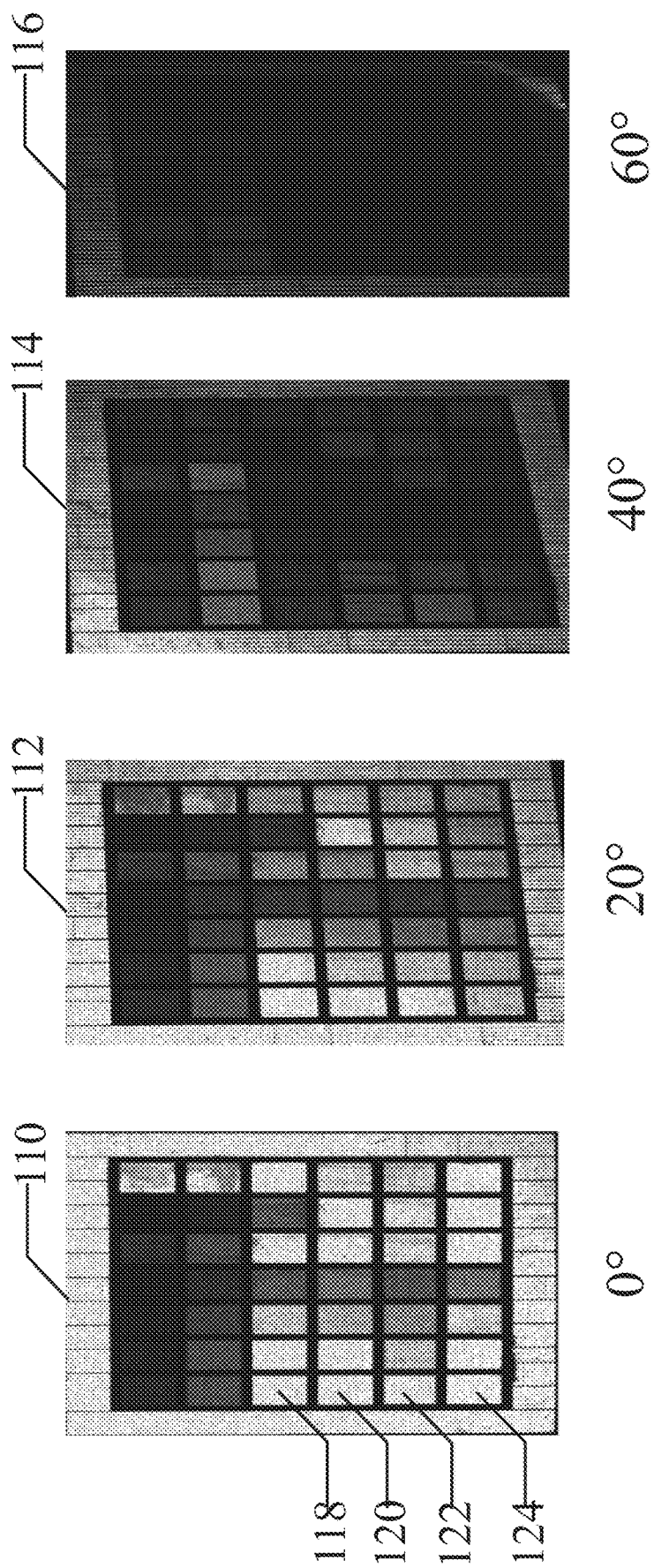
FIG. 6 illustrates sign sheeting performance of a prior art cube corner retroreflective sheeting at various entrance angles.

FIG. 6 shows images 110, 112, 114, 116 collected from a sign panel utilizing conventional retroreflective materials at four different entrance angles. The panel contains various colors of sheeting types, with white sheeting in the leftmost column of the panel. Images were collected with an 850 nm active camera, and the lower four rows of samples contain sheeting types that conform to TIR geometries produced with vertically-aligned prism apexes in a conventional retroreflective material. Sample 118 is ASTM Type IV white sheeting, sample 120 is ASTM Type VIII white sheeting, sample 122 is ASTM Type IX white sheeting, and sample 124 is ASTM Type XI white sheeting. Image 110 was collected at a 0-degree entrance angle and shows the baseline intensity levels. Image 112 was collected at a 20-degree entrance angle and shows reduced intensity levels. Image 114 at a 40-degree entrance angle and image 116 at a 60-degree entrance angle show dramatic reduction of intensity levels at these higher entrance angles in conventional retroreflective materials.

Figure 7:
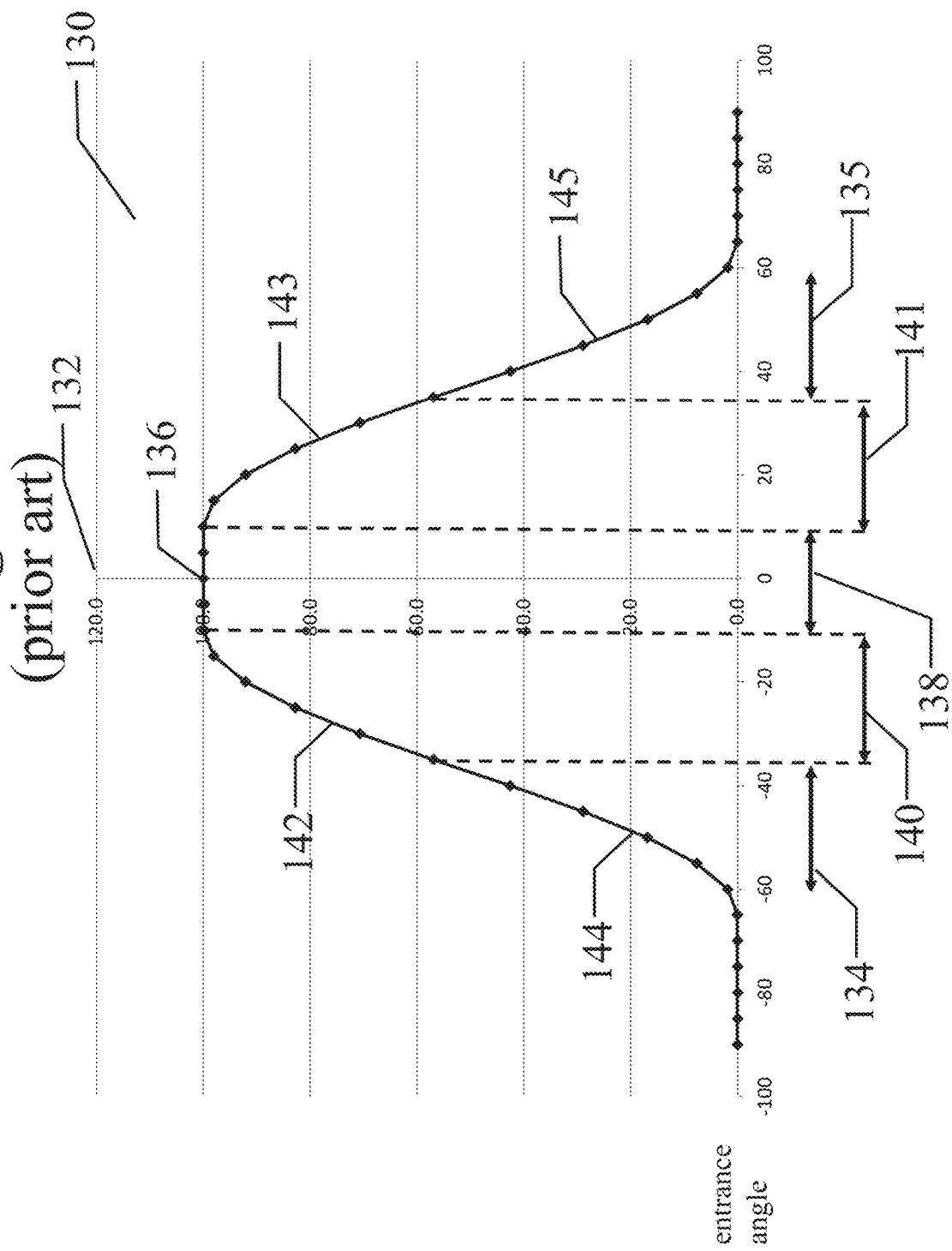
FIG. 7 illustrates the retroreflectivity response for a prior art cube corner article.

FIG. 7 shows a graph 130 of reflected intensity value 132 versus entrance angle 134 for a retroreflective element of a conventional retroreflective material having an apex axis that is parallel to the surface normal. The narrow, central part of the curve 136 shows intensity values for the range 138 of smaller entrance angles that produce TIR retroreflectance. The intermediate entrance angle ranges 140, 141 produce intensity curves 142, 143 that are a result of a combination of TIR retroreflectance and internal spectral reflectance. The outer entrance angle zones 134, 135 representing larger entrance angles produce intensity values 144, 145 that are a result of dramatically lower levels of TIR and internal spectral reflectance.

For purposes of describing the various embodiments, the following terminology and references may be used with respect to retroreflective articles or materials in accordance with one or more embodiments as described.

"Surface" means an exterior boundary of an article or material. In some embodiments, a surface may interface with air or vacuum at least partially surrounding the article or material. In other embodiments, a surface may interface with another object, such as a lens or coating. A surface may be comprised of one or more facets, and may be either rigid or flexible in form, smooth or rough in texture, and homogeneous or heterogeneous in composition.

"Front surface" means a surface of an article or material exposed to electromagnetic waves, beams, or rays that strike the article or material and may be reflected or refracted by the article or material.

"Back surface" means a surface of an article or material generally opposite from a front surface.

"Layer" means a region of an article or material having thickness relative to a front surface of the article or material. In some embodiments, a layer may be a region of a medium of generally uniform thickness presenting an area that is substantially parallel in orientation to an orientation of the front surface of the article or material, and in some embodiments a layer may have varying thickness and present an area that is not of generally uniform thickness or substantially parallel in orientation to an orientation of the front surface of the article or material. In some embodiments, a layer may be coextensive with an area of the front surface of the article or material, and in other embodiments, a layer may not be coextensive with an area of the front surface. In some embodiments, a layer may be generally rigid and planar, and in other embodiments, a layer may be generally flexible. In some embodiments, a layer may be a medium that is homogenous in composition or construction, and in other embodiments, a layer may be of a medium that is non-homogenous and non-uniform in composition or construction.

"Normal" describes a direction that intersects a surface or boundary at right angles.

"Entrance angle" is defined as the angle relative to normal of a ray, beam, or wave of electromagnetic radiation as it strikes the front surface.

"Boundary" is a change of medium defined by a face, facet, surface, and/or material having a different index of refraction.

"Incidence angle" or "angle of incidence" is defined as the angle relative to normal of a ray, beam, or wave of electromagnetic radiation as it strikes a boundary within an article or material.

"Cube corner element" describes a TIR retroreflective element, such as a trihedral pyramid, having multiple faces of the pyramid oriented at 90 degrees with respect to each other.

"Apex" means the tip of a cube corner pyramid as defined by the intersection of the edges of the faces of the pyramid other than the edges of the base of the pyramid.

"Apex axis" means a line intersecting the apex of a cube corner pyramid that is equidistant from each face of the pyramid.

"Near-normal TIR range" means a range of entrance angles which produce TIR based only on a retroreflection by a single layer of retroreflective elements for a given type of medium and retroreflective elements.

"Net retroreflectivity" means a combined retroreflectivity produced by retroreflective elements arranged in more than a single layer of a reflective article or material.

"Ultrawide angle" means a range of angles for which TIR retroreflectivity occurs as a result of net retroreflectivity that is greater than a near-normal TIR range for a given type of medium and retroreflective elements. In various embodiments, ultrawide angle may mean+/−35 degrees, +/−40 degrees, +/−45 degrees, and +/−60 degrees.

"ASTM D4956" means the ASTM International (formerly the American Society for Testing and Materials) standard ASTM D4956-19, Standard Specification for Retroreflective Sheeting for Traffic Control, ASTM International, West Conshohocken, Pa., 2019, www.astm.org. ASTM D4956 defines minimum retroreflectivity performance requirements for commonly-used ASTM sheeting types like I, II, III, IV, VII, VIII, IX, X and XI. Retroreflectivity requirements are established based on the observer's or sensor's observation angle and entrance angle, and minimum retroreflectivity levels are expressed in units of candelas*lux$^{-1}$*m$^{-2}$. For ultrawide angle performance versions of ASTM sheeting types that meet enhanced performance specifications for retroreflectivity at larger entrance angles, the units of measure for retroreflectivity can be expressed in units other than candela or lux (which are used based on the response of the human eye to light in the visible spectrum) such that the units are valid for light sources and sensors in the range of 400-1000 nanometers that includes the near infrared spectrum.

"Transparent" means a degree of clarity of a material as measured by the ability to transmit image-forming light through the material. The measure of light transmission expressed in terms of transparency or transmissivity is a ratio of the light intensity measured with a sample of the material present in the light beam versus with the sample of the material not present in the light beam. For various embodiments, a material is considered to be transparent if the transmissivity is at least 95% for light at 550 nm as measured according to ASTM International standard ASTM D1746-17, Standard Test Method for Transparency of Plastic Sheeting, ASTM International, West Conshohocken, Pa., 2019, www.astm.org. For other embodiments with more transparency, a material is considered to be transparent if the transmissivity is at least 97% for light at 550 nm as measured according to ASTM D1746. For even more transparency for other embodiments, a material is considered to be transparent if the transmissivity is at least 99% for light at 550 nm as measured according to ASTM D1746. Like retroreflectivity, standards for measuring transparent materials are measured in the visible spectrum. Given that the ultrawide angle performance in embodiments includes light spectrums beyond the visible spectrum that include near-infrared wavelengths of light, the measure of transparency or transmissivity for visible light frequencies and for frequencies beyond those of the visible spectrum would be made consistent with the standards for measuring transparency. For the present disclosure a material is considered a transparent sheet-type material in the wavelengths beyond 700 nm if the transmissivity as measured consistent with ASTM D1746 for light at 850 nm is at least set forth in the at least 90% of the transmissivity as measured for light at 550 nm, and the transmissivity as measured consistent with ASTM D1746 for light at 1000 nm is at least set forth in the at least 85% of the transmissivity as measured for light at 550 nm.

FIG. 8 illustrates an embodiment for a reflective article 150 in accordance with various aspects of the present inventions that contains a mezzanine retroreflective layer 152 operably connected to a base retroreflective layer 154.

The properties of the base retroreflective layer 154 of various embodiments are similar to prior art retroreflective articles that utilize TIR from cube corner elements 155, for example, utilizing a material or materials that result in TIR reflectance within a near-normal TIR range 158 of angles 164, 166 that is relative to a surface normal shown at 156.

There are various properties of the mezzanine retroreflective layer 152 in various embodiments that may differ from the properties of a conventional base retroreflective layer 154. First, the mezzanine retroreflective layer 152 produces a substantially unmodified internal path for incident and reflected rays having an entrance angle in the range 158 of angles for TIR reflectance 164, 166 such that the mezzanine retroreflective layer 152 propagates these rays with entrance angle within the near-normal TIR range 158 to the base retroreflective layer 154. Second, the mezzanine retroreflective layer 152 produces TIR reflectance for some, most, or all of rays that have entrance angles in the range of angles 160, 162 that lie outside the near-normal TIR range 158 for the base retroreflective layer 154. Third, the mezzanine retroreflective layer 152 produces an increase of entrance angles which are outside of the near-normal TIR range 158 for rays entering the front surface from all directions, not just a particular dimensional direction.

Figure 9D:
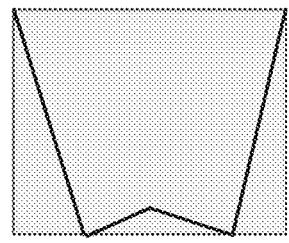
FIG. 9D illustrates a second cross-sectional view of a single tilted apex axis cube corner retroreflective feature for FIG. 9B.
Figure 9B:
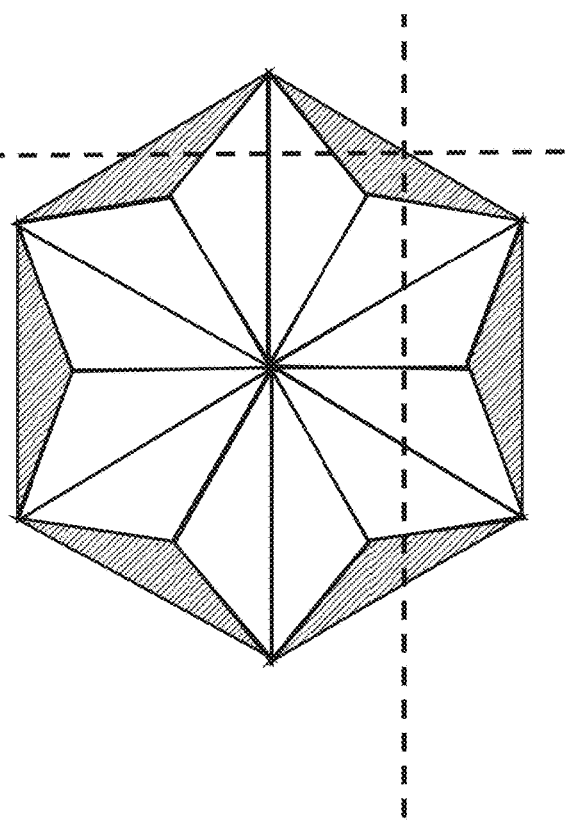
FIG. 9B illustrates a more detailed plan view of a single tilted apex axis cube corner retroreflective feature for FIG. 9A.
Figure 9C:
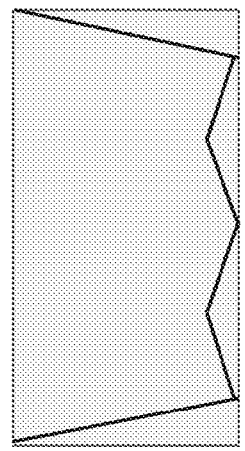
FIG. 9C illustrates a first cross-sectional view of a single tilted apex axis cube corner retroreflective feature for FIG. 9B.

FIG. 9A shows geometry of a cube corner architecture of embodiments wherein the apex axis of the faces of the trihedral prism used as the retroreflective element in the mezzanine layer is tilted relative to normal of a front surface of the article or material. As shown, for example, in FIG. 9B, each repeating structure of a cube corner feature in this embodiment consists of 18 faces organized as six groups of three cube corner faces 174, with each of the faces 174 of the cube corner groups aligned generally 90 degrees from each other. The apex angle 184 relative to a vector directly opposite the normal vector is determined by the high point 170 of the cube corner structure and the low points 172 of the cube corner structure. The cube corner geometry of the high point 170, low points 172 and the refractive indexes of the interfacing materials will determine the TIR incident angles at the surface of retroreflective articles in accordance with these embodiments. The apex angle 184 as indicated along an apex axis 185 that is tilted relative to a vector directly opposite a normal vector entering the front surface indicates the relative tilt for the set of faces intersecting at that apex of the trihedral cube corner for the base retroreflective layer. Cross-sectional representations of different aspects of the cube corner structure are shown in FIG. 9C and FIG. 9D. FIG. 9C shows what can be characterized as a double bottom W shape indicating the angles of the faces at the cross-sectional line taken at the bottom of FIG. 9B. FIG. 9D shows what can be characterized as a single bottom W shape (shown rotated 90 degrees) and indicating the angles of the faces at the cross-sectional line taken at the right side of FIG. 9B.

Figure 10:
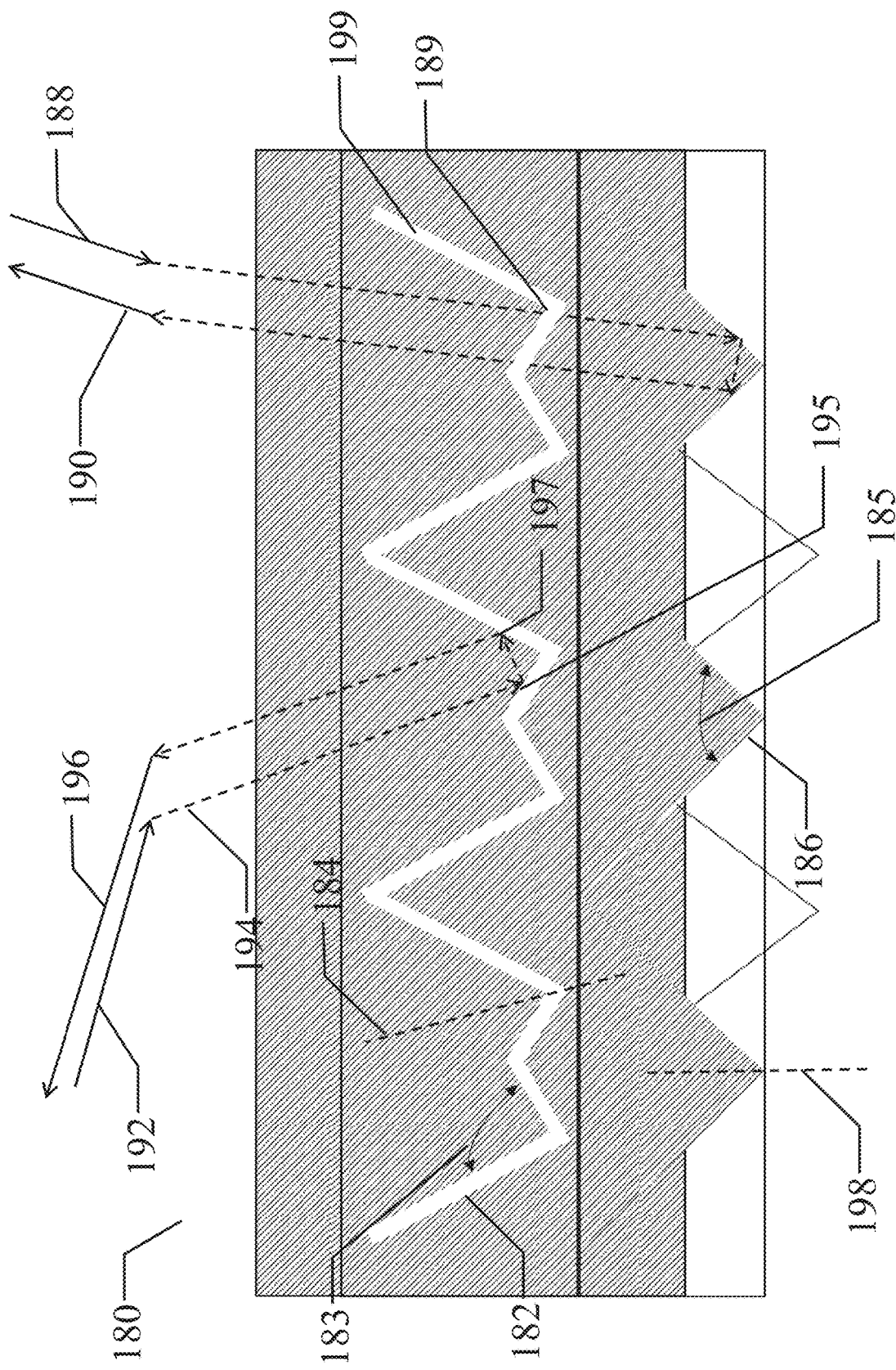
FIG. 10 illustrates a cross-sectional view of reflective sheeting in accordance with an embodiment of the present invention with a normal apex axis cube corner base layer and a tilted apex axis cube corner mezzanine layer.

FIG. 10 illustrates a two-layer article 180 produced from a single article material with a structured embedded air mezzanine layer 182 and a structured base layer 186. The mezzanine layer 182 is configured as a trihedral prism with three planes, substantially perpendicular to one another, with the apex angle 184 of the prism having a tilted apex axis orientation as described in FIG. 9. The base layer 186 is configured as a trihedral prism with three planes, substantially perpendicular to one another, with the apex axis of the prism 198 in a non-tilted orientation and parallel to the surface normal of the article or material. In the embodiment shown, the angle between the faces 183 at the mezzanine layer 182 and the faces 185 at the base layer 186 are roughly the same for each cube corner element in each array, and in this embodiment are shown at about 90 degrees. In the cross-sectional view of this embodiment as shown in FIG. 10, the mezzanine layer 182 is depicted as a series of generally W-shaped figures and the base layer 186 is depicted as a series of generally V-shaped figures. Alternatively, constructions of the mezzanine retroreflective layer 182 in other embodiments may utilize a material other than air that has a low index of refraction sufficient for TIR for the higher entrance angle rays to be retroreflected by the mezzanine layer 182.

Ray 188 enters the article 180 at an angle that is sufficiently small (near normal) and will thus be within the near-normal TIR range for the cube corner base layer 186. Upon interaction with the near-horizontal face of the prism of mezzanine layer 182 the path of the ray 188 is essential unmodified as it passes through the embedded air gap associated with the mezzanine layer 182. The light experiences TIR at the faces of the base layer 186 cube corner structure 174 and is directed back through the face 189 of the prism of mezzanine layer 182. The exiting ray is refracted at the article surface and produces a TIR ray 190 that is essentially parallel to and in the opposite direction of the ray 188.

Ray 192 enters the medium at an angle that is beyond the near-normal TIR range and is refracted at the surface of medium 180. The refracted ray 194 encounters a near-horizontal face 195 of the prism in the mezzanine 182 layer at an angle that is greater than critical angle, thus experiencing TIR. The reflected ray encounters a face 197 of the mezzanine 182 layer at an angle that is greater than the critical angle and also experiences TIR. The resulting ray 196 is refracted at the article 180 surface and is projected in a direction that is essentially parallel to and in the opposite direction of the ray 192.

The width of the gaps 199 of air or other material that form the faces of the trihedral prisms of the mezzanine layer 182 can be as small as one micron. In various embodiments, the width of the gap 199 should be sufficiently large to produce TIR at the surface of the article 180 for ultrawide angle rays. A completely connected trihedral prism structure could, in practice, result in structural integrity issues of the article when the prism material is air. In practice, and to increase manufacturability and structural integrity, in various embodiments the intersection points of the trihedral prisms of the mezzanine layer 182 can be filled with the article material without appreciable loss in TIR performance. In other embodiments, face connection vias can be provided between the material faces of the gap 199 to further improve structural integrity.

Figure 11:
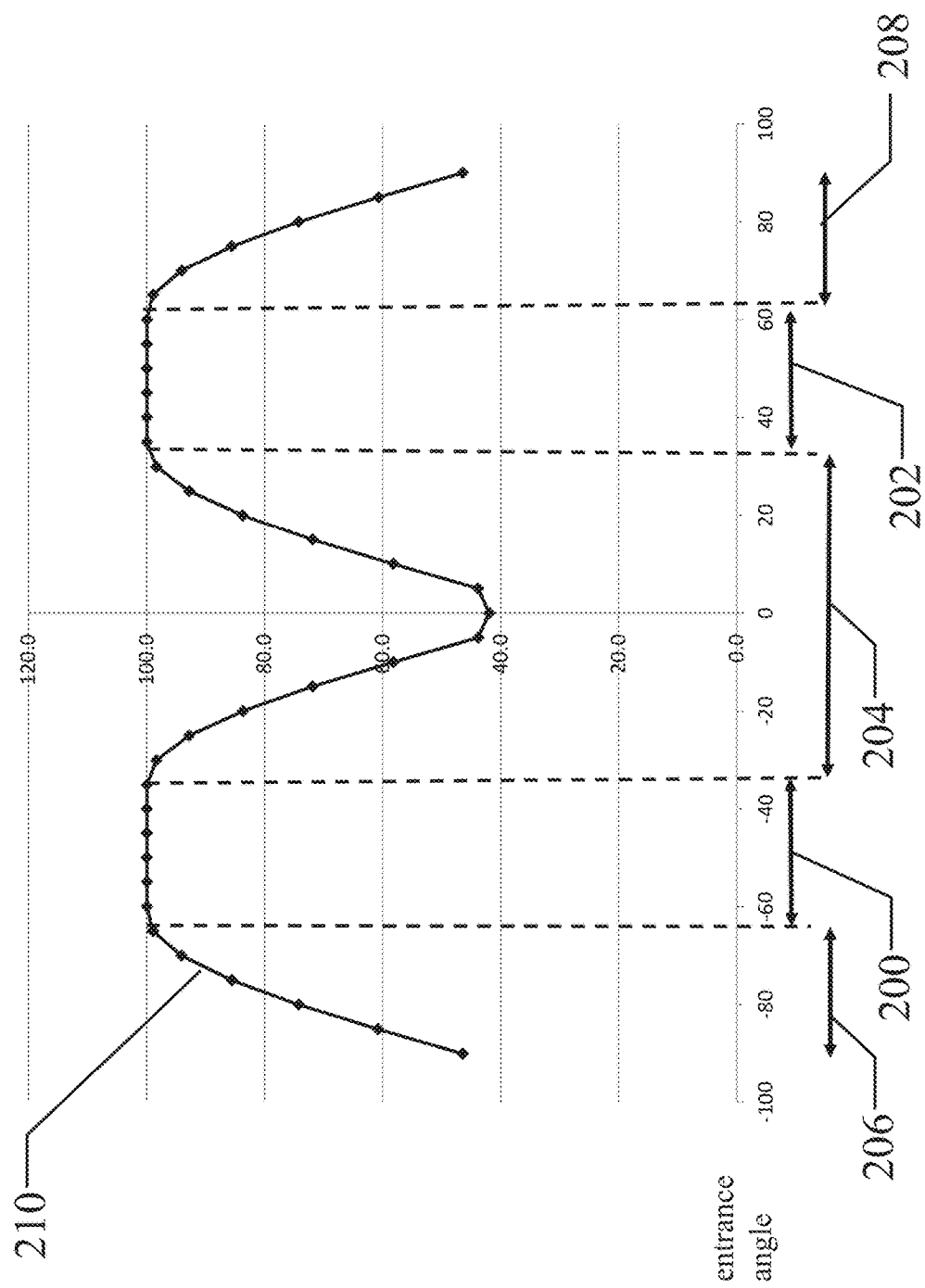
FIG. 11 illustrates the mezzanine layer retroreflectivity response for the sheeting of FIG. 10.

FIG. 11 illustrates the response of the mezzanine layer and the side lobes produced by an embodiment of a tilted apex axis cube corner geometry. For FIG. 11, the cube corner parameters are:

$\eta_0$—index of refraction of air at article surface=1.0
$\eta_1$—index of refraction of article medium=1.6
$\eta_2$—index of refraction of mezzanine air gap=1.0
$\eta_3$—index of refraction of base layer air gap=1.0
base layer cube corner apex angle=180°
mezzanine layer cube corner apex angle=162°

Utilizing Eq. 1 and the indices of refraction ($\eta_1$ and $\eta_2$) the critical angle for the mezzanine faces equates to 38.7°. In embodiments, the relatively lower indices of refraction of the body layer and/or the mezzanine layer are relatively lower. In some embodiments, the indices of refraction are less than 1.7. In other embodiments, the indices of refraction are less than 1.5. The equations for the minimum and maximum angles in the medium for the side lobes for TIR reflectivity for the various tilted apex axis are:

$$\text{TIR-negative-lobe-min} = (\theta_{apex} - 180) - (45 - \theta_{crit}) \quad \text{Eq. 3}$$

$$\text{TIR-negative-lobe-max} = (\theta_{apex} - 180) + (45 - \theta_{crit}) \quad \text{Eq. 4}$$

$$\text{TIR-positive-lobe-min} = -(\theta_{apex} - 180) - (45 - \theta_{crit}) \quad \text{Eq. 5}$$

$$\text{TIR-positive-lobe-max} = -(\theta_{apex} - 180) + (45 - \theta_{crit}) \quad \text{Eq. 6}$$

Where $\theta_{apex}$ is the angle of the apex of the cube corner elements $\theta_{crit}$ is the critical angle relative to the normal of the cube corner faces Utilizing a cube corner apex angle of 162 degrees equates to side lobes with TIR ranges of −24.3 to −11.7 degrees and 11.7 degrees to 24.3 degrees. Because these angular ranges are within the article medium, they must be converted to in-air angles by utilizing Eq. 1 with the indexes of refraction for air and the medium. Eq. 1 determines the in-air TIR angular limits as −61.5 to −34.4 degrees and 34.4 to 61.5 degrees. The table below shows some side lobe behavior based on varying some geometry and material parameters. For the table headings, $\eta_0$ is the index of refraction of the air layer above the medium, $\eta_1$ is the index of refraction of the medium, $\eta_2$ is the index of refraction of the material that forms the gap at the mezzanine layer, and $\eta_3$ is the index of refraction of the material that forms the gap at the base layer. The Mezz layer apex angle is the tilt of the particular cube corner element configuration as measured relative to a vector directly opposite a normal vector entering the front surface.

| $\eta_0$ | $\eta_1$ | $\eta_2$ | $\eta_3$ | Base layer crit. Angle | Base layer TIR max | Mezz layer apex angle | Mezz layer crit. Angle | Mezz layer TIR min | Mezz layer TIR max |
|---|---|---|---|---|---|---|---|---|---|
| 1 | 1.6 | 1 | 1 | 38.7 | 10.1 | 162 | 38.7 | 34.4 | 61.5 |
| 1 | 1.6 | 1 | 1 | 38.7 | 10.1 | 164 | 38.7 | 38.1 | 67.7 |
| 1 | 1.6 | 1 | 1 | 38.7 | 10.1 | 167.36 | 38.7 | 44.6 | 89.2 |
| 1 | 1.7 | 1 | 1.1 | 40.3 | 8 | 158 | 36 | 24.3 | 64.2 |

-continued

| $\eta_0$ | $\eta_1$ | $\eta_2$ | $\eta_3$ | Base layer crit. Angle | Base layer TIR max | Mezz layer apex angle | Mezz layer crit. Angle | Mezz layer TIR min | Mezz layer TIR max |
|---|---|---|---|---|---|---|---|---|---|
| 1 | 1.7 | 1 | 1.1 | 40.3 | 8 | 160 | 36 | 28 | 71.8 |
| 1 | 1.7 | 1 | 1.1 | 40.3 | 8 | 162.06 | 36 | 31.9 | 89.2 |
| 1 | 1.8 | 1.1 | 1.2 | 41.8 | 5.7 | 156 | 37.7 | 25.2 | 58.7 |
| 1 | 1.8 | 1.1 | 1.2 | 41.8 | 5.7 | 158 | 37.7 | 29.1 | 65.4 |
| 1 | 1.8 | 1.1 | 1.2 | 41.8 | 5.7 | 161.41 | 37.7 | 36 | 88.8 |

The article response 210 for the mezzanine layer in FIG. 11 shows the TIR range for negative angles 200, the TIR range for positive angles 202, and the three ranges 204, 206, 208 that exhibit combinations of net retroreflectivity due to TIR and specular reflection.

Figure 12:
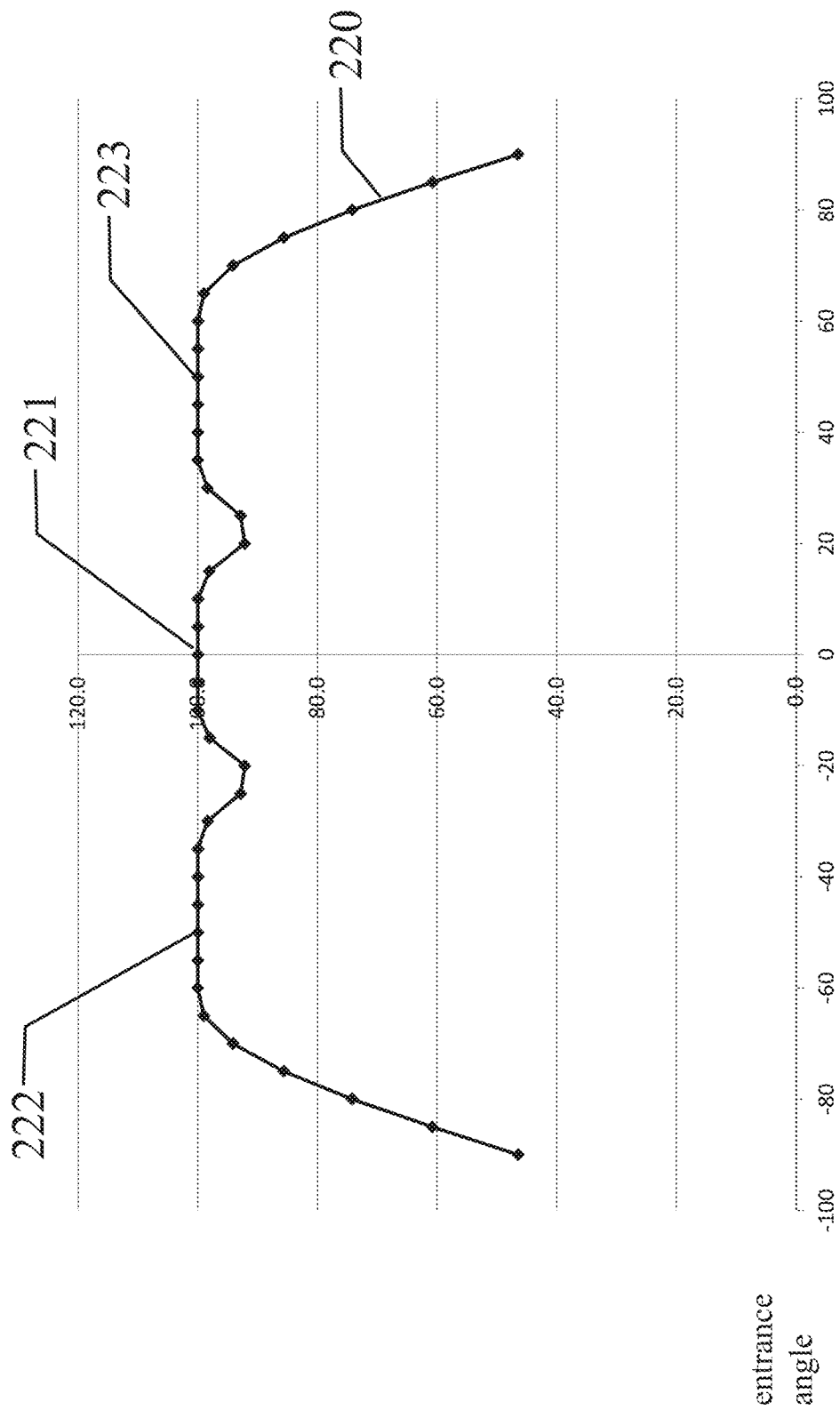
FIG. 12 illustrates the combined base layer and mezzanine layer retroreflectivity response for the sheeting of FIG. 10.

FIG. 12 shows the combined response 220 for the mezzanine layer and the base layer for a combined article. The response 220 has a middle lobe 221 that is due to TIR for the base layer cube corner geometry and has two side lobes 222, 223 that are due to TIR for the mezzanine layer cube corner geometry.

Figure 13:
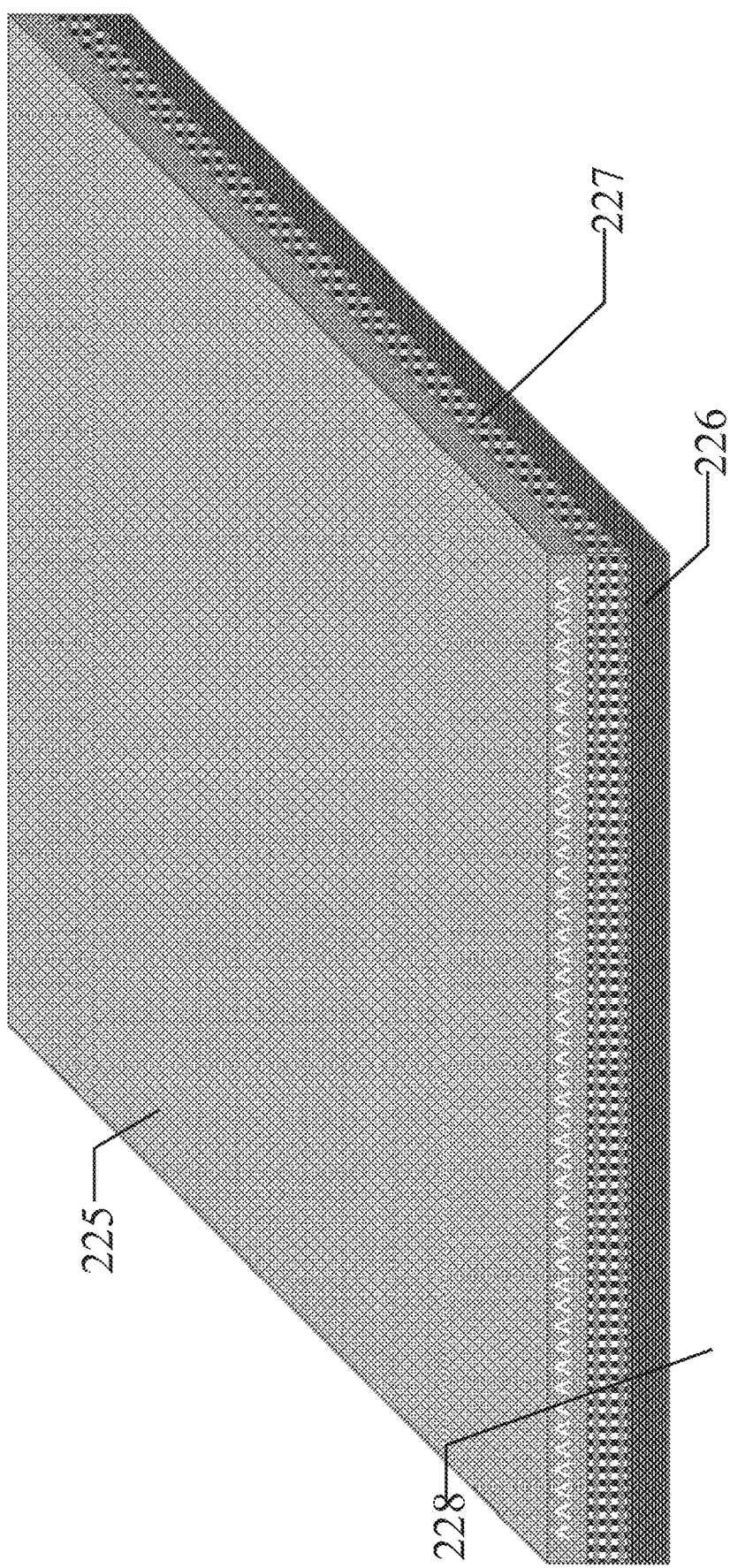
FIG. 13 illustrates a sign construction with a backing material, a sheeting material, and a mezzanine layer overlay in accordance with an embodiment of the present invention.

FIG. 13 shows a traffic sign 225 construction utilizing standard sign sheeting material 227 with an ultrawide-entrance-angle overlay 228. The backing 226 for the sign is made from a material like aluminum, to which a standard sign sheeting 227 material is affixed. The base sign material 227 is selected from products that include, but are not limited to, embedded glass beads or retroreflective cube corners. The overlay 228 exhibits the properties of TIR over ultrawide entrance angle ranges due to side-lobe geometry while passing through low-entrance-angle rays for optical processing by the base sheeting 227 material.

Figure 14:
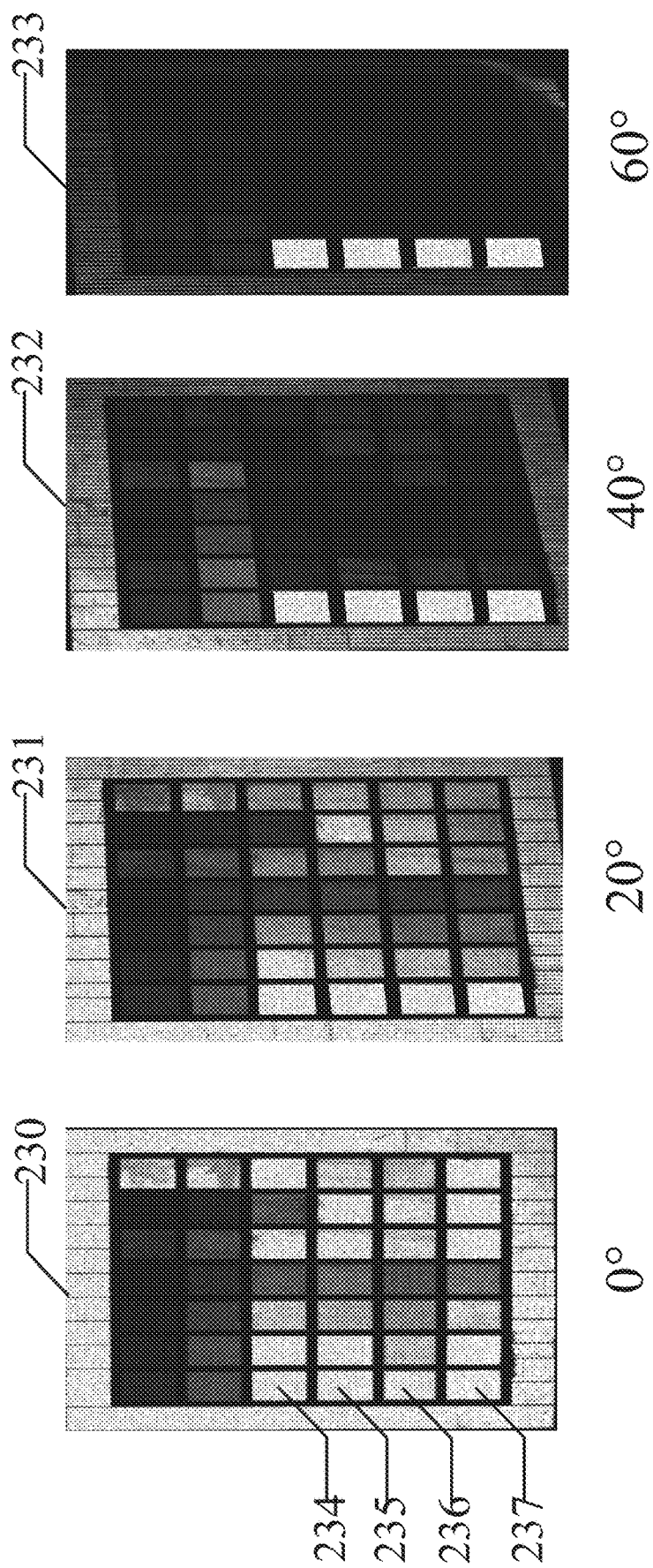
FIG. 14 illustrates improved entrance angle performance for four sheeting materials with mezzanine layer overlays in accordance with embodiments of the present invention.

FIG. 14 shows the effect of adding an ultrawide overlay that contains tilted apex axis, cube corner structures to the face of existing sign sheeting materials. Images 230, 231, 233, 233 show the effect of a modified sign panel at four different entrance angles. The panel contains various colors of sheeting types, with white sheeting in the leftmost column of the panel. Sample 234 depicts ASTM Type IV white sheeting with a tilted apex angle cube corner overlay as a mezzanine layer, sample 235 depicts ASTM Type VIII white sheeting with a tilted apex angle cube corner overlay as a mezzanine layer, sample 122 depicts ASTM Type IX white sheeting with a tilted apex angle cube corner overlay as a mezzanine layer, and sample 124 depicts ASTM Type XI white sheeting with a tilted apex angle cube corner overlay as a mezzanine layer. Image 230 depicts a 0-degree entrance angle and shows the baseline intensity levels. Image 231 depicts a 20-degree entrance angle and shows appreciably similar intensity levels to the baseline levels. Image 232 at 40-degree entrance angle and image 233 at 60-degree entrance angle show no appreciable reduction of intensity levels.

The ASTM D4956 minimum requirements for three commonly-used sheeting types are:

|  | Observation Angle | Entrance Angle | $R_A$ |
|---|---|---|---|
| Type IV White | 0.1° | −4° | 500 |
|  | 0.1° | +30° | 240 |
| Type VIII White | 0.1° | −4° | 1000 |
|  | 0.1° | +30° | 460 |
| Type IX White | 0.1° | −4° | 660 |
|  | 0.1° | +30° | 370 |

Candela is a measure of luminous intensity and lux is measure of luminance. Both measures are based on the response of the human eye to light. As a result, both measures do not have utility outside the visible spectrum (400-700 nm). With the advent of NIR sensors for vehicle safety systems and autonomous vehicle navigation, new performance measures are required for road-based markers. One measure of retroreflectivity can utilize milliwatts (mW) for reflected intensity and watts per square meter (W/m$^2$) for incident intensity. Restating the ASTM D4956 requirements for Types IV, VIII and IX sheeting and using the conversion factors of 1 W/m$^2$=683 lux at 555 nm and 1 candela=18.399 mW, the minimum performance table can be restated as follows, with retroreflectivity expressed in units of milliwatts per watt per meter squared, or mW*W$^{-1}$*m$^{-2}$:

|  | Observation Angle | Entrance Angle | $R_A$ |
|---|---|---|---|
| Type IV White | 0.1° | −4° | 13.5 |
|  | 0.1° | +30° | 6.5 |
| Type VIII White | 0.1° | −4° | 26.9 |
|  | 0.1° | +30° | 12.4 |
| Type IX White | 0.1° | −4° | 17.8 |
|  | 0.1° | +30° | 10.0 |

In embodiments, ultrawide angle performance versions of ASTM sheeting types are enabled that meet enhanced performance specifications for retroreflectivity at larger entrance angles. In embodiments, the units of measure for retroreflectivity are expressed in units that are valid for light sources and sensors in the range of 400-1000 nanometers. The table below shows minimum proposed performance levels for ultrawide angle versions of three popular ASTM sheeting types:

|  | Observation Angle | Entrance Angle | $R_A$ |
|---|---|---|---|
| Type IV-WA White | 0.1° | −4° | 21.1 |
|  | 0.1° | +30° | 9.7 |
|  | 0.1° | +60° | 7.3 |
| Type VIII-WA White | 0.1° | −4° | 24.2 |
|  | 0.1° | +30° | 19.4 |
|  | 0.1° | +60° | 14.5 |
| Type IX-WA White | 0.1° | −4° | 16.0 |
|  | 0.1° | +30° | 12.8 |
|  | 0.1° | +60° | 9.6 |

Ultrawide angle versions of ASTM sheeting types I, II, III, VII, X, and XI are enabled in embodiments. Suggested minimum performance specifications for each ultrawide-angle type will utilize a base performance level of something less than a base performance of a similar non-ultra wide angle type of sheeting to account for the potential loss of reflection through the mezzanine retroreflective layer. Performance level of at least about 90% of the base performance level as the non-ultrawide angle type for −4 degree entrance angles. Performance levels for +30 degrees for ultrawide angle sheeting may be established at a base level of at least about 80% of the −4 degree retroreflectivity level. Performance levels for +60 degrees for ultrawide angle sheeting may be established at a base level of at least about 60% of the −4 degree retroreflectivity level. Other performance level percentages for ultrawide angle retroreflective articles may be utilized and would be in accordance with other embodiments.

Figure 15:
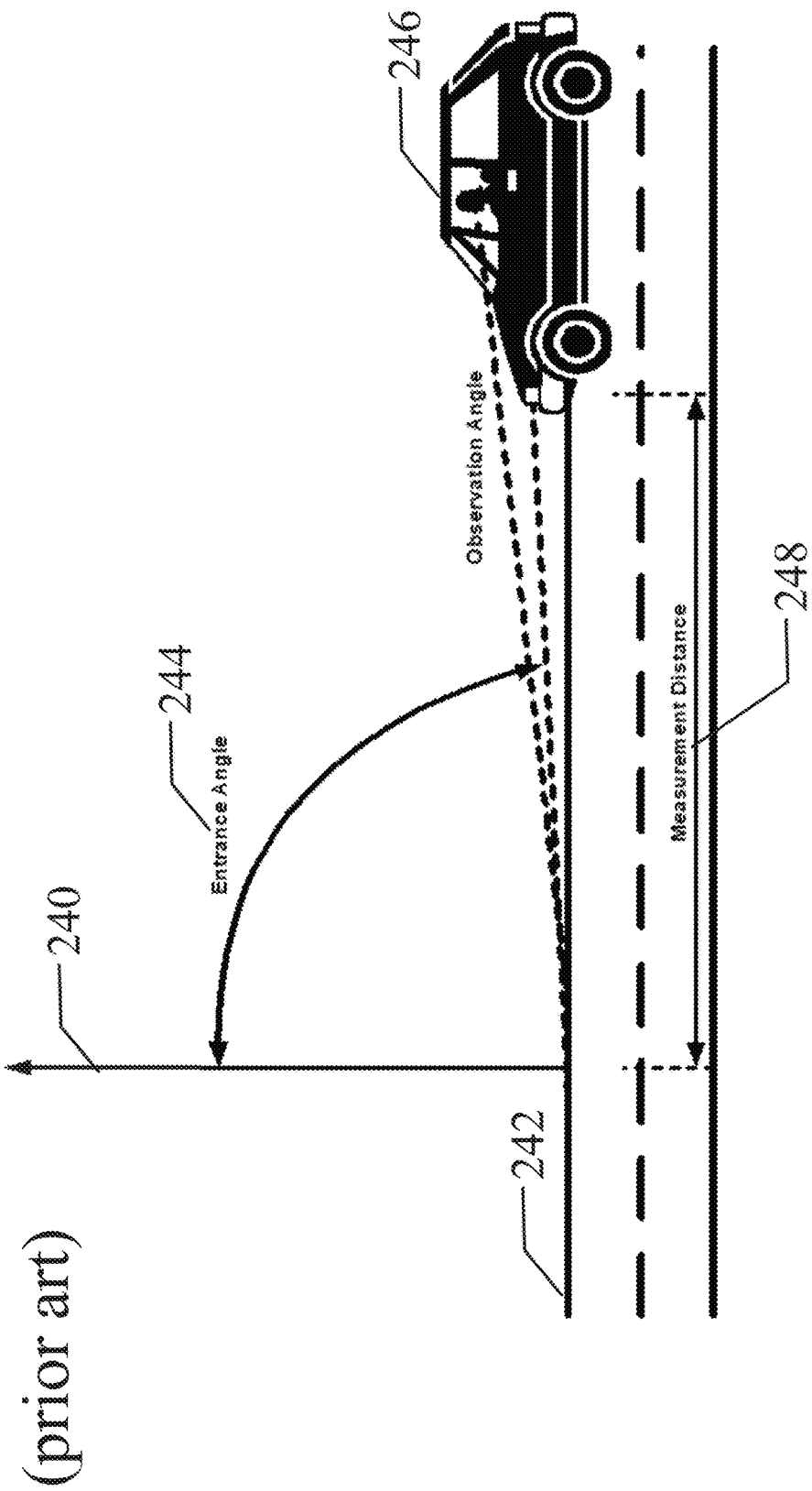
FIG. 15 illustrates prior art definition of entrance angle for pavement markings.

FIG. 15 shows a prior art description of pavement marking 242 geometry. A sensor is shown as vehicle 246 whereby the headlamps function as the sensor illuminator. The entrance angle 244 is defined as the angle formed by the vector from the illuminator to a point on the pavement marker 242 and the normal vector to the same point on the pavement marking 240. In the United States, pavement markers are typically evaluated utilizing a 30-meter geometry, consisting of a measurement distance 248 of 30 meters and an entrance angle 244 of 88.76 degrees.

Figure 16:
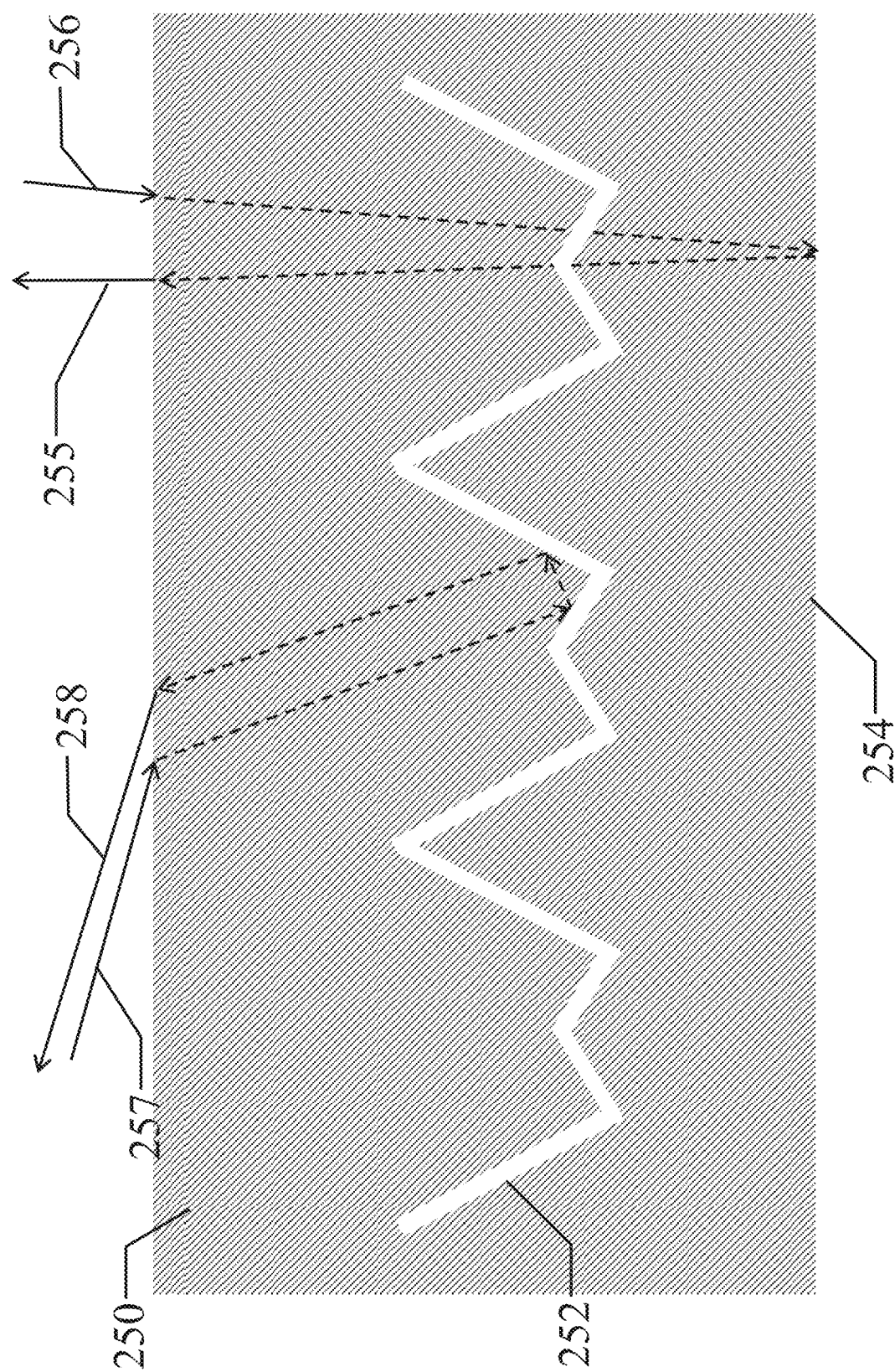
FIG. 16 illustrates a sign or pavement marking embodiment with a tilted apex axis cube corner construction.

FIG. 16 shows a cross section of a pavement marking embodiment that utilizes embedded TIR structures for increased retroreflectivity at ultrawide angles. The pavement marker 250 is produced from a material 254 that contains a structured air gap 252 formed as a tilted apex axis cube corner construction forming a mezzanine retroreflective layer. The angle of the apex axis is selected appropriately to produce a TIR angle zone that extends to +/−90 degrees from the marker 250 normal. Light ray 257 at a near-horizontal direction encounters the surface and is refracted toward the structured air gap 252. Upon experiencing TIR at the three faces of the cube corner, the resulting retroreflected ray is refracted at the surface and the refracted ray 258 is roughly parallel to and in the opposite direction of the ray 257. Ray 255 enters the medium 250 at an angle that is outside the near-normal TIR range for the article. Because the refracted ray encounters the air gap at an angle that is not greater than the critical angle, the ray passes through the air gap to the lower layer of the marker 250 where it experiences specular reflection. The reflected ray 256 exits the medium 250 at an angle that is near-parallel to and generally in the opposite direction of the incident ray 255.

Figure 17:
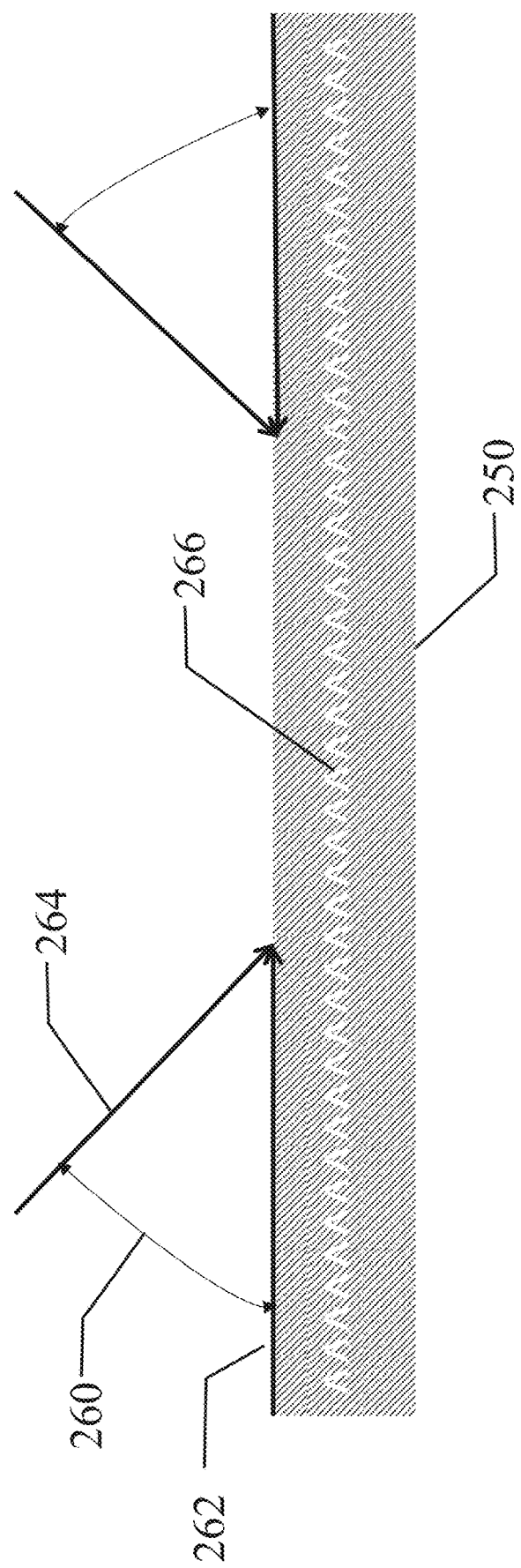
FIG. 17 illustrates pavement marking entrance angle performance for a TIR article for the embodiment in FIG. 16.

FIG. 17 illustrates the relationship between the tilted apex axis cube corner construction 266 of a pavement marker 250 and the range of angles 260 that produce TIR reflectivity. The smallest negative TIR angle 262 is near surface normal and the largest negative TIR angle 264 is at an angle that is well above the incident ray of any vehicle-based sensor on a roadway. Utilizing an air gap constructed from a tilted apex axis cube corner geometry will require an apex angle that is selected based on the index of refraction of the material that comprises the medium 250. Utilizing Equations 1, 3 and 4, the following table displays apex angles and various materials that yield near horizontal TIR angles for the pavement marker 250. For the table headings, the index of refraction of the air layer above the medium is 1.0, $\eta_1$ is the index of refraction of the medium, and $\eta_2$ is the index of refraction of the material that forms the gap at the cube corner structure.

| $\eta_1$ | $\eta_2$ | Apex Angle | Min Neg. TIR Angle | Max. Neg. TIR Angle | Min Neg. TIR Angle | Max. Neg. TIR Angle |
|---|---|---|---|---|---|---|
| 1.5 | 1.0 | 173.62 | −89.7 | −60.4 | 60.4 | 89.7 |
| 1.6 | 1.0 | 167.36 | −89.2 | −44.6 | 44.6 | 89.2 |
| 1.7 | 1.0 | 162.06 | −89.2 | −31.9 | 31.9 | 89.2 |

Figure 18:
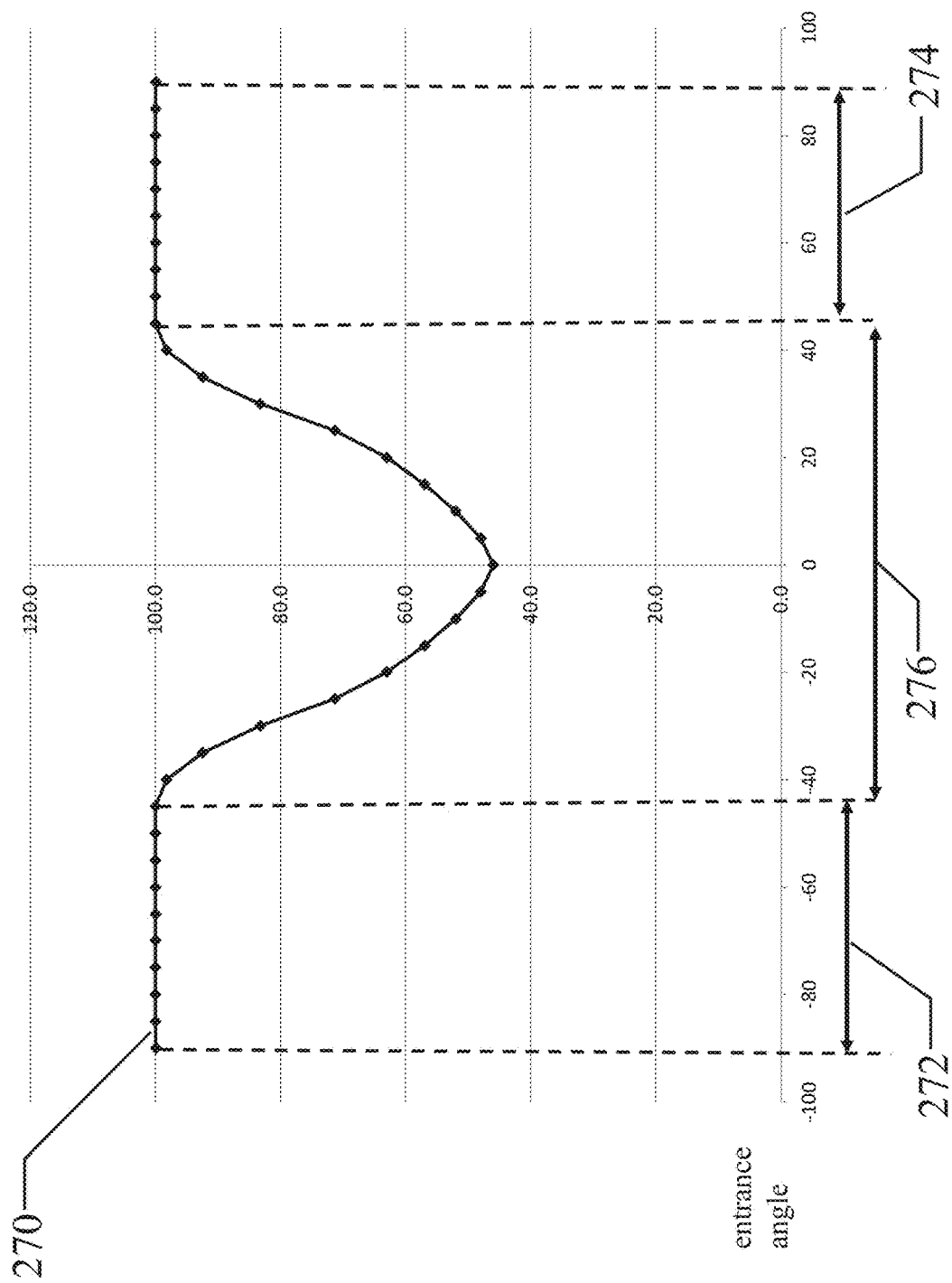
FIG. 18 illustrates the pavement marking retroreflectivity response for the embodiment in FIG. 16.

FIG. 18 illustrates the response 270 of the pavement marker and the side lobes produced by the tilted apex axis cube corner geometry utilizing a medium index of refraction of 1.6 and an apex angle of 167.36 degrees. The negative TIR lobe angular range 272 extends from essentially −90 degrees to −44.6 degrees, and the positive TIR lobe angular range 274 extends from 44.6 degrees to near 90 degrees. The middle range 276 of angles produce a lower response because incident rays in this range do not experience TIR in the marker medium.

Figure 19:
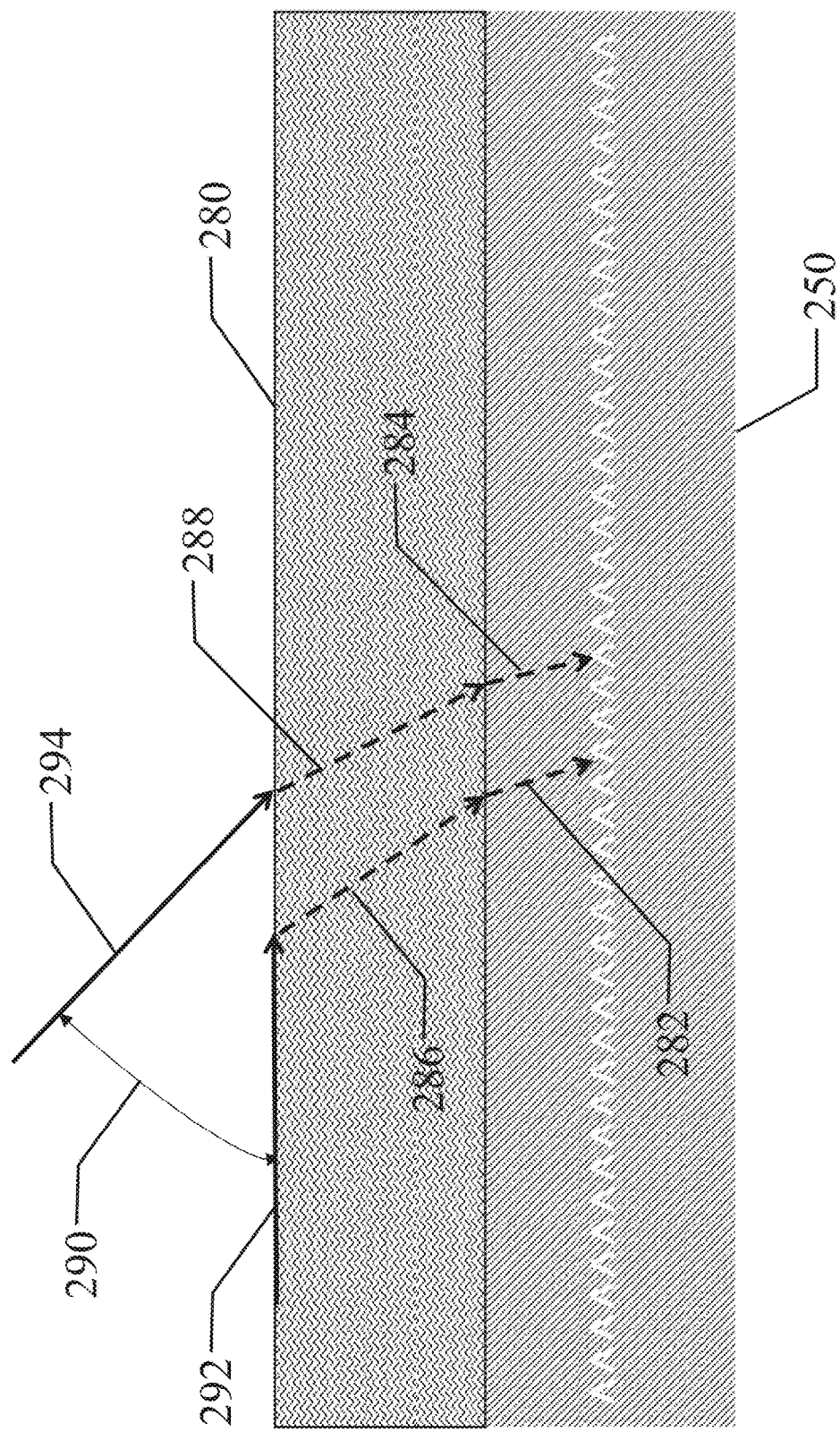
FIG. 19 illustrates wet article pavement marking retroreflectivity response.

Pavement marker manufacturers will utilize techniques and materials at the surface of their products to establish good performance in both dry environments and on wet roadways. Manufacturers will typically include two types of materials with varying geometries to account for different indexes of refraction between dry surface elements and water-covered road surface elements. FIG. 19 illustrates an embodiment with a pavement marker 250 with a flat surface that includes a non-vertical apex cube corner TIR embedded structure with a lower index of refraction than the marker 250 medium. A layer of water 280 rests upon the marker 250.

Utilizing a medium index of refraction of 1.6, a structured air gap index of refraction of 1.0, and an apex angle of 167.36 degrees, the medium exhibits a minimum negative TIR angle 282 of −38.68 degrees and a maximum negative TIR angle of −26.04 degrees. Utilizing an index of refraction of 1.33 for water, Eq. 1 produces a minimum negative TIR angle 286 of −48.74 degrees in water 280 and a maximum negative TIR angle 288 of −31.88 degrees in water 280. Utilizing an index of refraction of 1.0 for air, Eq. 1 produces a minimum negative TIR angle 292 of −89.21 degrees in air and a maximum negative TIR angle 294 of −44.62 degrees in air. As shown by the computations for a water-covered pavement marker 250, the minimum and maximum TIR angles 292, 294 for the pavement marker 250 are not affected by surface water on a medium with a flat surface.

Figure 20:
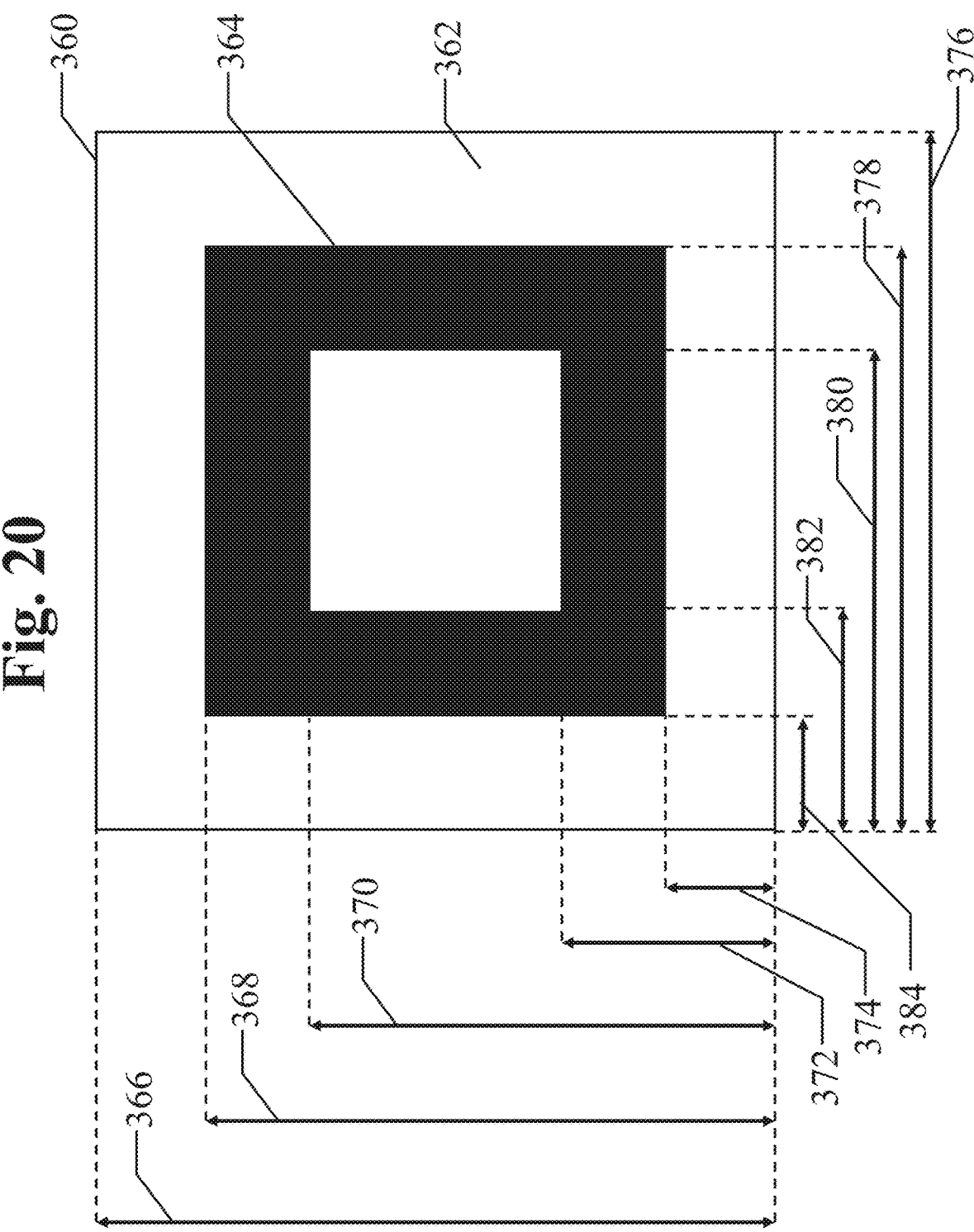
FIG. 20 illustrates an embodiment of a proposed traffic sign design for safety systems and machine vision systems.

Ultrawide angle reflective sign sheeting based on TIR described in embodiments enables new capabilities in automotive safety applications. FIG. 20 displays a proposed new "fiducial" traffic sign 360 design and layout. The sign is produced with a white, wide-angle TIR sheeting material 362 with a structured, non-reflective overlay 364. Proposed dimensions for a U.S. version of the fiducial sign 360 are:

| Reference | Description | Dimension (inches) |
|---|---|---|
| 366 | sign height | 12 |
| 368 | sign base to overlay top | 10 |
| 370 | sign base to overlay cutout top | 8 |
| 372 | sign base to overlay cutout bottom | 4 |
| 374 | sign base to overlay bottom | 2 |
| 376 | sign width | 12 |
| 378 | sign edge to right overlay edge | 10 |
| 380 | sign edge to right overlay cutout | 8 |
| 382 | sign edge to left overlay cutout | 4 |
| 384 | sign edge to start of overlay | 2 |

Figure 21:
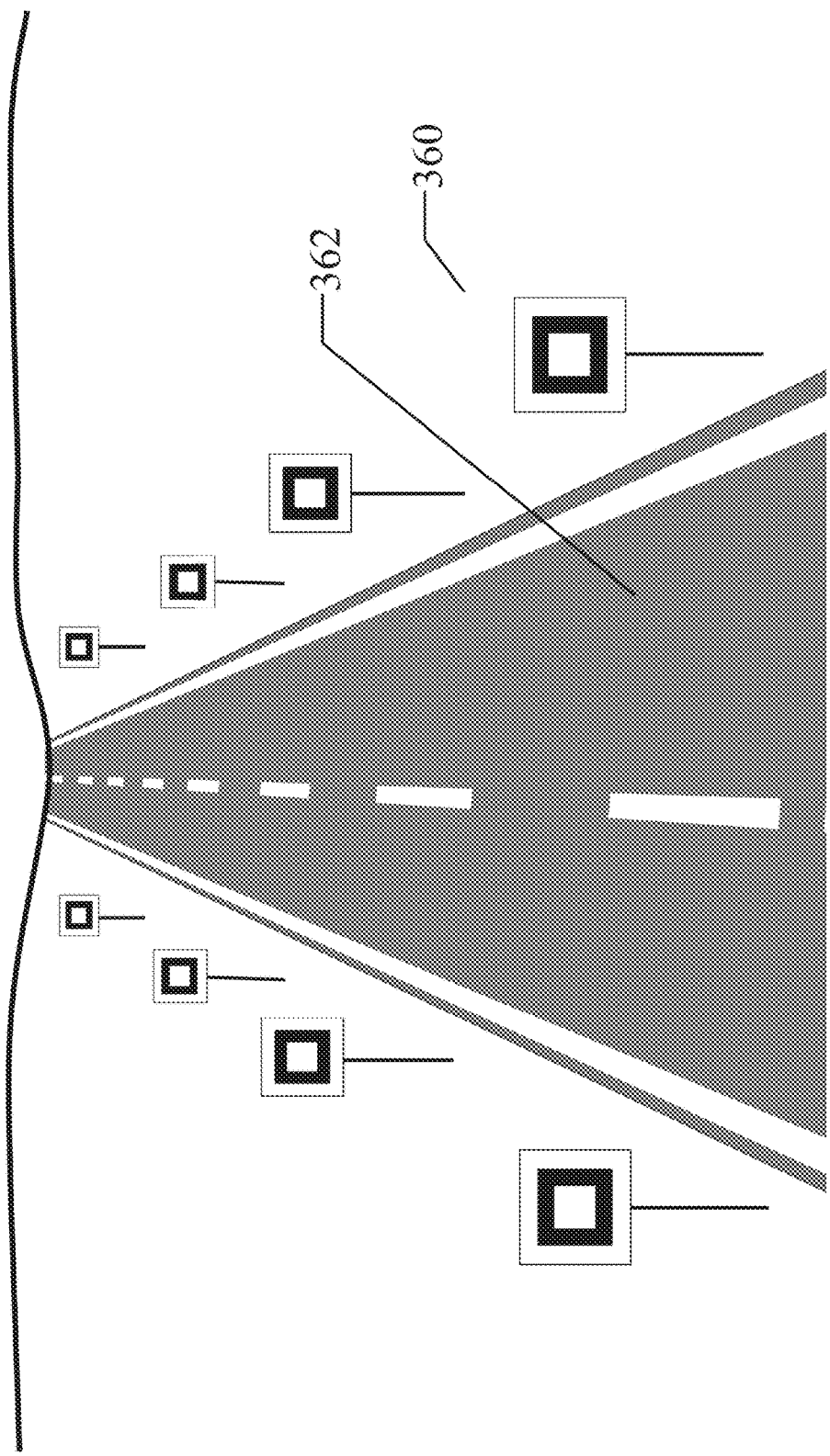
FIG. 21 illustrates a positioning of the proposed traffic sign of FIG. 20 along a roadway.

FIG. 21 displays a use of a fiducial sign 360 along a roadway 362. Signs are placed on each side of the road 362 and are at sufficient density so at least two consecutive signs on a side of the road are simultaneously available within the field of view of a typical machine vision sensor on board a vehicle traversing the roadway. The ultrawide angle TIR property of the sign sheeting type allows the vehicle to be closer to the near-range signs and still exhibit high-intensity sensing. A wide-angle sensor viewing of the ultrawide angle retroreflective signs will, as a result, enhance the spatial accuracy of roadway elements that are referenced relative to the fiducial signs.

Figure 22:
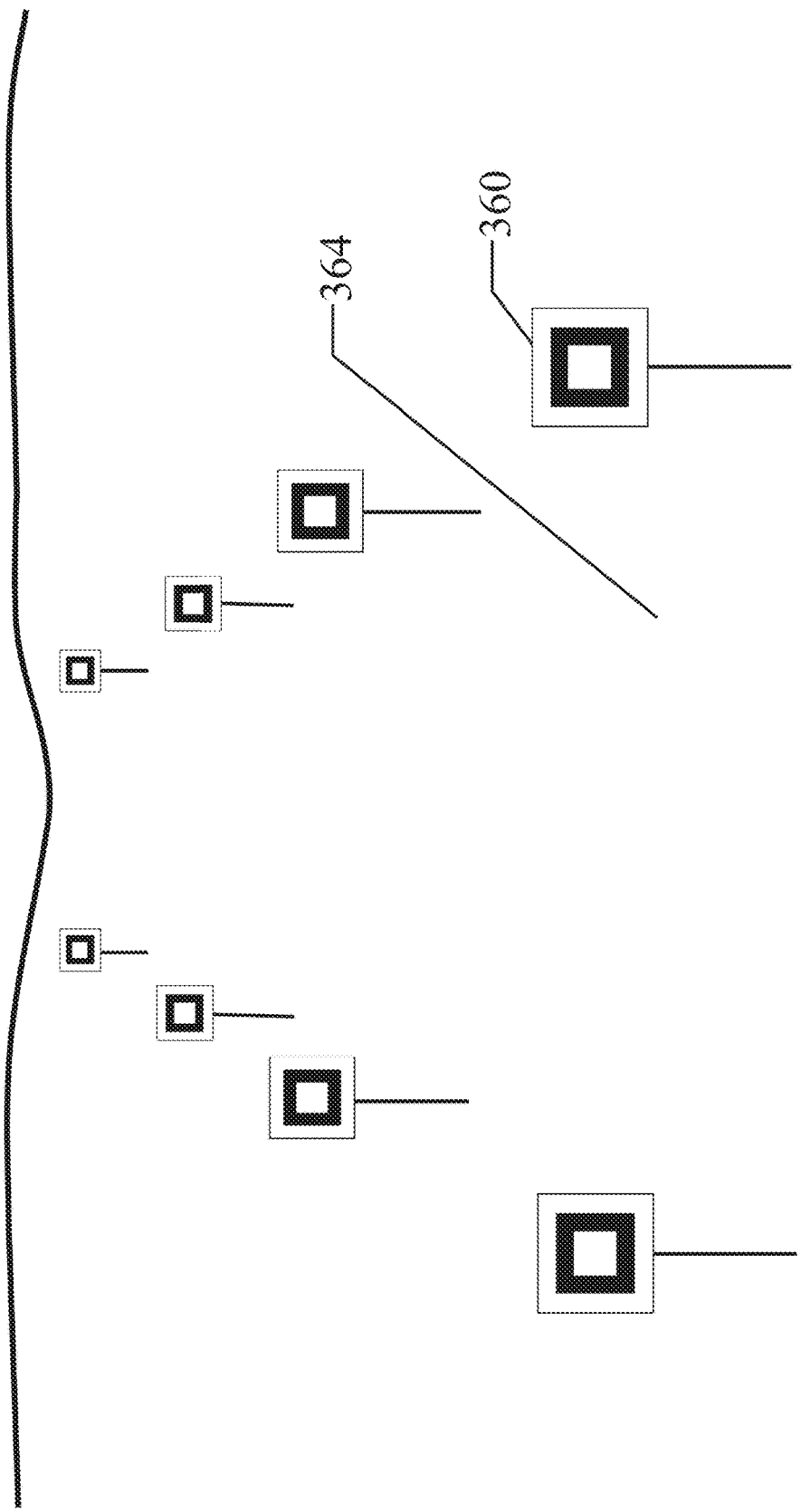
FIG. 22 illustrates a roadway with horizontal roadway elements obscured by snow.

FIG. 22 illustrates the roadway with visible fiducial signs 360 and a non-visible roadway due to snow 364 cover. The vehicle sensor detects a sufficient number of fiducial 360 signs, thus allowing the vehicle processing system to determine the relative location of necessary roadway elements.

Figure 23:
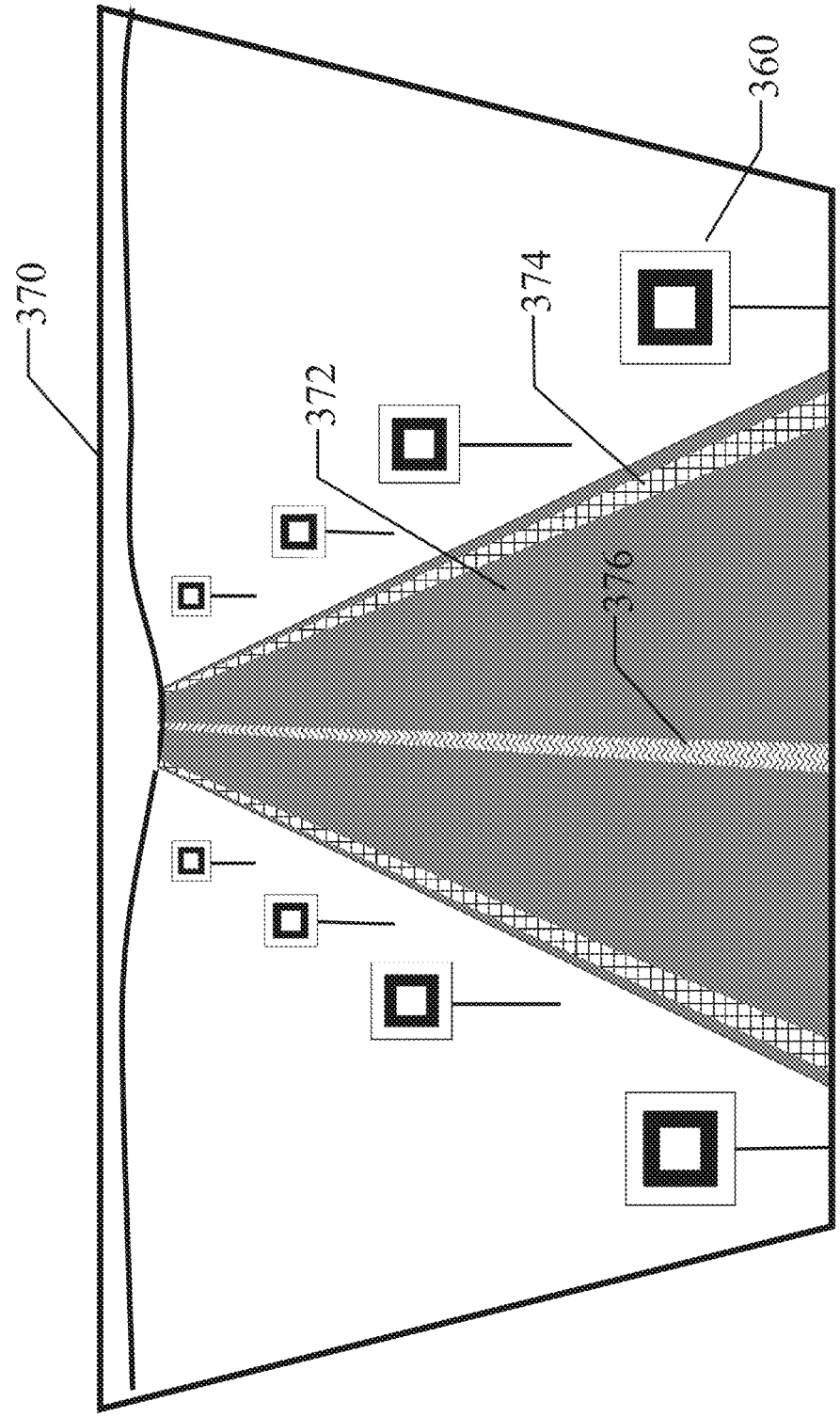
FIG. 23 illustrates a heads-up display that projects obscured roadway elements.

FIG. 23 illustrates a use for the relatively-positioned roadway elements contained within the vehicle's high-definition map containing previously mapped locations of each roadway element. The vehicle windshield 370 acts as a heads-up display (HUD) whereby the vehicle positioning system can accurately display messages and information. In this view the roadway signs are viewed through the windshield or are obscured by an attenuating environment like snowfall. The vehicle sensor, however, maintains optical contact with the fiducial signs and displays them on the HUD 370. Other important roadway elements a like pavement surface 372, edge lines 374 and centerlines 376 are displayed in proper orientation to a driver or communicated to an autonomous control system that can accurately and safely navigate the roadway based on the added roadway elements after corresponding the sensed roadway elements with the high-definition map.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A machine vision system for a vehicle, compromising:
   an active camera configured to dynamically image roadway elements in a field of view from the vehicle, the roadway elements having an ultrawide angle retroreflectance that provide retroreflectivity values of at least 60% of the ASTM D4956 minimum value for −4 degree-entrance-angle retroreflectivity level for entrance angles from −60 degrees to +60 degrees from a normal to a surface of the traffic sign, and
   a processing system operably coupled to the camera configured to identify the signs based at least in part on a sheeting type having the ultrawide entrance angle retroreflectivity.

2. The system of claim 1, wherein the retroreflectivity values of the signs at a 30 degree entrance angle are at least 80% of the ASTM D4956 minimum values for retroreflectivity at a −4 degree entrance angle.

3. The system of claim 1, wherein the retroreflectivity values of the signs at a 60 degree entrance angle are at least 60% of the ASTM D4956 minimum values for retroreflectivity at a −4 degree entrance angle.

4. The system of claim 1, further comprising a heads-up display configured to project a sign image based on an output of the processing system.

5. The system of claim 1, wherein the processing system includes a database of a map of locations of roadway elements and the processing system is configured to correlate imaged roadway elements with locations of the roadway elements in the database and project the locations of corresponding roadway elements on the heads-up display in a location relative to the identified signs.

* * * * *